United States Patent
Sato et al.

(10) Patent No.: US 7,577,135 B2
(45) Date of Patent: Aug. 18, 2009

(54) IP TELEPHONE SYSTEM

(75) Inventors: Hiroyuki Sato, Fukushima-ken (JP);
Shinji Saitou, Fukushima-ken (JP);
Tadashi Saitou, Koriyama (JP);
Takahiro Sasaki, Fukushima-ken (JP);
Fumio Urayama, Fukishima-ken (JP);
Hiroshi Endo, Fukushima-ken (JP);
Tatsuya Yoshida, Fukushima-ken (JP);
Shinsuke Isono, Fukushima-ken (JP);
Kaoru Mashiko, Fukushima-ken (JP);
Takahiro Abe, Fukushima-ken (JP);
Kazuhiko Kubo, Fukushima-ken (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 508 days.

(21) Appl. No.: 11/371,227

(22) Filed: Mar. 9, 2006

(65) Prior Publication Data
US 2006/0217997 A1 Sep. 28, 2006

(30) Foreign Application Priority Data

| Mar. 10, 2005 | (JP) | ............................. 2005-067515 |
| Mar. 10, 2005 | (JP) | ............................. 2005-067633 |
| Mar. 10, 2005 | (JP) | ............................. 2005-067709 |
| Mar. 10, 2005 | (JP) | ............................. 2005-067816 |
| Mar. 10, 2005 | (JP) | ............................. 2005-067940 |
| Mar. 10, 2005 | (JP) | ............................. 2005-068101 |

(51) Int. Cl.
*H04L 12/50* (2006.01)
*H04Q 11/00* (2006.01)

(52) U.S. Cl. ...................................... 370/386
(58) Field of Classification Search ................. 370/386, 370/252
See application file for complete search history.

(56) References Cited

U.S. PATENT DOCUMENTS

| 2002/0101860 A1* | 8/2002 | Thornton et al. ............. 370/352 |
| 2003/0202508 A1* | 10/2003 | Masuhiro et al. ............. 370/352 |
| 2004/0085893 A1* | 5/2004 | Wang et al. .................. 370/216 |
| 2004/0213215 A1* | 10/2004 | Kakiuchi ...................... 370/352 |

FOREIGN PATENT DOCUMENTS

JP  2004-229112 A  8/2004

\* cited by examiner

*Primary Examiner*—Pankaj Kumar
*Assistant Examiner*—Gautam Sharma
(74) *Attorney, Agent, or Firm*—Foley & Lardner LLP

(57) ABSTRACT

When a trouble is developed in an IP exchange (TM) 2 or a circuit (network) 5, a backup exchange 6 (backup TM) is switched over from a waiting system to an operating system, and all IP terminals Eqi inside lodgments A, B, . . . N also log out from the IP exchange (TM) 2, and transmit the IP addresses to the backup exchanges 6 (backup TM) inside own lodgment, respectively, and log in there with a result that the extension telephone calls inside own lodgment is made possible by a control of the backup exchange 6 (backup TM), and therefore, even when a fault occurs in the IP exchange or the circuit, the IP terminals inside the lodgment are backed up and the actuations of the IP terminals are continuously operated, and for example, the extension phone calls inside the lodgment can be realized.

9 Claims, 15 Drawing Sheets

◀---- :LAYER 1 FAULT OCCURS/RECOVERY NOTICE

IP TELEPHONE SYSTEM

CROSS-REFERENCE TO RELATED APPLICATION

This application claims all benefits accruing 35 U.S.C. § 119 from Japanese Patent Application No. 2005-67515, Japanese Patent Application No. 2005-67633, Japanese Patent Application No. 2005-67709, Japanese Patent Application No. 2005-67816, Japanese Patent Application No. 2005-67940 & Japanese Patent Application No. 2005-68101, filed on Mar. 10, 2005.

BACKGROUND OF THE INVENTION

1. Field of the Invention

The present invention relates to an IP telephone system for performing centralized control and operation of all the IP terminals installed at each lodgment, and in particular, it relates to an IP telephone system, in which duplexing of a main control device configuring an IP exchange, N+1 redundancy of a signal control device, and duplexing of a circuit are attempted and a back up exchange is installed at each lodgment, so that a backup is performed for a device trouble and a circuit fault, thereby enhancing reliability of the system operation 2. Description of the Related Art In a conventional exchange, an IP exchange (TM portion) comprising an IP call control portion (SC portion) performing a call control of an IP terminal through a circuit (network) such as a LAN and the like, and an exchange control portion (CC portion) for performing a data exchange control of the IP call control portion (SC portion) and storing the IP terminal through a HUB is disclosed in Japanese Patent Application No. 2004-229112.

The IP exchange (TM portion) thus configured is also capable of mounting a plurality of IP terminals according to a connecting processing capacity (the number of sets of the IP terminals) of the IP terminals to be stored.

However, even if the conventional IP exchange (TM) assumes a number of IP terminals stored in the IP call control portion (SC portion) as one lodgment, when a trouble of the IP exchange (MT) or a fault of the circuit occurs, there is a possibility of all the IP terminals inside the lodgment becoming unable to operate, and in case the lodgment is divided into branch offices or sales offices of the region, there is a first problem that this causes an obstacle to sales activity.

Further, in case the conventional IP exchange (TM) provides a plurality of IP call control portions (SC portions) and each IP call control portion (SC portion) is stored with a number of IP terminals through a circuit (network), and a number of IP terminals stored for each IP call control portion (SC portion) are configured as one lodgment, when a common message such as lump information and the like is transmitted to all the IP terminals of each lodgment from the IP exchange (TM), it is necessary to convert the common message into a multicast message and transmit it to all the IP terminals.

However, in case the IP terminal which becomes a transmission target of the multicast message increases extremely in number, a data amount of the common message also inevitably increases, and there is a second problem in that a traffic amount of the load and the circuit (network) of the IP exchange (TM) becomes enormous.

Further, since the conventional IP exchange (TM) is single in exchange control portion (CC portion), when a trouble occurs in the IP call control portion (SC portion), there is a third problem in that the entire system breaks down in case the IP telephone system is configured by storing a number of IP terminals in a plurality of IP call control portions (SC portions), respectively.

Further, when assuming a case where a plurality of IP call control portions (SC portions) are stored with a number of IP terminals respectively, and a lodgment having a plurality of IP terminals is provided for each IP call control portion (SC portion), in case the IP call control portion (SC portion) develops a trouble, the operation of the lodgment in charge of this IP call control portion (SC portion) is no longer possible.

Further, since the conventional IP exchange (TM) is connected to the circuit (network) of one system with the IP call control portion (SC portion) of one system, when a fault occurs in a LAN port of the IP call control portion (SC portion), there is a fourth problem in that a plurality of IP terminals stored in the IP call control portion (SC portion) become all not usable.

Further, in case the conventional IP exchange (TM) is mounted with a plurality of IP call control portions (SC portions), each of which stores a number of IP terminals, there is a fifth problem in that a number of IP terminals stored in this IP call control portion (SC portion) are plunged into a inoperative state when a trouble occurs in one set IP call control portion (SC portion).

BRIEF SUMMARY OF THE INVENTION

First, the present invention has been made to solve the first problem, and a first object of the invention is to provide a backup exchange for backing up the IP terminals inside the lodgment and continuously operating the actuation of the IP terminals, thereby, for example, making extension telephone calls inside the lodgment possible, even when a fault occurs in the IP exchange or the circuit, and for example, provide a switching actuation sequence of the back up exchange making extension telephone calls inside the lodgment possible.

Further, the present invention has been made to solve the second problem, and an object of the second problem is to designate a lodgment which is the transmission target of a common message from the IP exchange (TM), and transmit the common message by a unicast message between the IP exchange (TM) and the lodgment, and convert the unicast message into the multicast messages at the lodgment, and transmit the multicast message to all the IP terminals inside the lodgment, and provide the backup exchange connected to a operating system circuit (network) and an IP converter connected to a waiting system circuit at each lodgment, and in case the backup exchange develops a trouble, provide an IP telephone system for executing an unicast-multicast by switching over to the IP converter.

Further, the present invention has been made in order to solve the third problem, and an object of the third problem is to perform duplexing of the main control device (CC) of the IP exchange (TM), and provide a backup SC in a plurality of signal control devices (SC), and provide a highly reliable IP telephone system which can continuously operate the system even if troubles occur in one set main control device (CC) and one set signal control device (SC).

Further, the present invention has been made in order to solve the fourth problem and an object of the fourth problem is to provide two-system LAN ports in the signal control device, and provide an IP telephone system capable of backing up the fault of the LAN port and continuously operating the system even if a fault occurs in one LAN port.

Further, the present invention has been made in order to solve the fifth problem and an object of the fifth problem is to turn the signal control device (SC) into N+1 redundancy, and in case a trouble occurs in one set signal control device in which a number of IP terminals of the lodgment are stored, back up the signal control device failed in the back up SC, and provide an IP telephone system capable of continuously using a number of IP terminals of the lodgment.

To achieve the first object, the IP telephone system according to the first aspect of the invention is an IP telephone system comprising: a main control device for controlling the entire operation of the IP exchange; the IP exchange of the center storing a plurality of IP terminals for each lodgment by a control of the main control device through the circuit and comprising a plurality of signal control devices for performing call controls; a circuit connecting between the IP exchange and the lodgment; a back up exchange for detecting a trouble of the IP exchange or a fault of the circuit and backing up the lodgment; and a plurality of lodgments comprising a plurality of IP terminal; and performs a centralized control and operation of all the IP terminals by the IP exchange, wherein the backup exchange backs up the extension telephone calls of a plurality of the IP terminals inside the lodgment at the trouble time of the IP exchange or the fault time of the circuit.

Since the backup exchange according to the first aspect of the invention backs up the extension telephone calls of a plurality of IP terminals inside the lodgment at the trouble time of the IP exchange or the fault time of the circuit, even when the trouble of the IP exchange of the center and the fault of the circuit occur, an inability of the entire telephone calls of the IP terminals inside the lodgment can be avoided, and the extension telephone calls inside the lodgment can be secured, and the telephone call service provided by the system can be minimally guaranteed.

Further, the backup exchange according to the present invention accepts the IP addresses logged in from a plurality of IP terminals, and switches over actuations of a plurality of IP terminals by a control of the IP exchange to actuations of a plurality of IP terminals by the control inside the lodgment.

The backup exchange according to the present invention accepts the IP addresses logged in from a plurality of IP terminals and switches over the actuations of a plurality of IP terminals by a control of the IP exchange to the actuations of a plurality of IP terminals by a control inside the lodgment, and therefore, even in the worst case of the trouble of the IP exchange of the center and the fault of the circuit, can back up the extension telephone calls of the IP terminals inside the lodgment.

Further, the backup exchange according to the present invention performs an access confirmation with the signal control device storing a plurality of IP terminals of the lodgment, and in case no access confirmation can be received from the signal control device, determines it as the fault of the IP exchange or the fault of the circuit, and switches over from a waiting state to an operating state.

The backup exchange according to the present invention performs an access confirmation with the signal control device storing a plurality of IP terminals of the lodgment, and in case no access confirmation can be received from the signal control device, determines it as the fault of the IP exchange or the fault of the circuit, and because of the switchover from a waiting state to an operating state, can easily and certainly detect the fault of the system, and smoothly proceed to the extension telephone calls of the IP terminals inside the lodgment.

Further, a plurality of IP terminals according to the present invention, in case a life check cannot be received from the signal control device, determines it as the fault of the IP exchange or the fault of the circuit, and after logging out from the signal control device, transmits the IP addresses to the backup exchange and logs in there.

A plurality of IP terminals according to the present invention, in case the life check cannot be received from the signal control device, determine it as the fault of the IP exchange or the fault of the circuit, and after logging out from the signal control device, transmits the IP address to the backup exchange and logs in there, and therefore, the IP addresses proceed from the control of the IP exchange of the center to the control of the backup exchange of the lodgment, and can receive the extension telephone services inside the lodgment, and can make an appeal for an ease of operation.

Further, to achieve an object of the first problem, the IP telephone system according to the second aspect of the invention is an IP telephone system comprising: the main control device for performing a centralized control of all the IP terminals; an IP exchange comprising a plurality of signal control devices for supervising and storing an IP terminal for each lodgment through the circuit by a control of the main control device; a circuit connecting between the IP exchange and the lodgment; a back up exchange for detecting a trouble of the IP exchange or a fault of the circuit and backing up the lodgment; and a plurality of lodgments comprising a plurality of IP terminal, wherein the backup exchange performs an access confirmation with the IP exchange in a waiting state, and comprises the actuation sequence to switch over to the operating state in case the access confirmation cannot be made from the IP exchange.

The backup exchange according to the second aspect of the invention performs the access confirmation with the IP exchange in a waiting state, and in case the access confirmation from the IP exchange cannot be secured, the backup exchange 6 comprises an actuation sequence to switch over to an operating state and therefore, when the fault of the IP exchange of the center and the fault of the circuit occur, switches over from the waiting state to the operating state, and can backup the extension telephone calls of the IP terminals inside the lodgment, thereby securing the extension telephone services of the IP terminals inside the lodgment.

To achieve an object of the second problem, the IP telephone system according to the third aspect of the invention is an IP telephone system comprising: a main control device for performing a centralized control of all the IP terminals; an IP exchange comprising a plurality of signal control devices for supervising and storing an IP terminal for each lodgment through the circuit by a control of the main control device; a circuit connecting between the IP exchange and the lodgment; a back up exchange for detecting a trouble of the IP exchange or a fault of the circuit and backing up the lodgment; and a plurality of lodgments comprising a plurality of IP terminal, wherein the IP exchange designates the lodgment and selectively transmits the unicast message of the common order.

The IP exchange according to the third aspect of the invention designates the lodgment and selectively transmits the unicast message of the common order, and therefore, can control the data amount of the common message transferring on the circuit, and can reduce the loads of the IP exchange and the circuit, thereby making it possible to attempt at the efficiency and the power saving of the system.

To achieve the third object, the IP telephone system according to the fourth aspect of the invention is an IP telephone system comprising: a main control device for controlling the entire operation of the IP exchange; an IP exchange of the center storing a plurality of IP terminals for each lodgment by a control of the main control device through the circuit and comprising a plurality of signal control devices for performing call controls; a circuit connecting between the IP exchange and the lodgment; a back up exchange for detecting a trouble of the IP exchange or a fault of the circuit and backing up the lodgment; and a plurality of lodgments comprising a plurality of IP terminal, and performing a centralized control and operation of all the IP terminals by the IP exchange, wherein the main control device installs the IP addresses in a plurality of signal control devices, and in case a trouble occurs in one set signal control device, changes the IP address of a spare signal control device to the IP address of the signal control device in which a trouble occurs, and performs a control for switching over the signal control device in which the trouble occurs to the spare signal control device.

The main control device according to the fourth aspect of the invention installs the IP addresses in a plurality of signal control devices, and in case a trouble occurs in one set signal control device, changes the IP address of a spare signal control device to the IP address of the signal control device in which a trouble occurs, and performs a control for switching over the signal control device in which the trouble occurs to the spare signal control device, and therefore, even when a trouble occurs in the signal control device during operation, the operation can be continued by switching over it to the spare signal control device, thereby enhancing the reliability of the system operation.

To achieve the fourth object, the IP telephone system according to the fifth aspect of the invention, is an IP telephone system comprising: a main control device for controlling the entire operation of the IP exchange; an IP exchange of the center storing a plurality of IP terminals for each lodgment by a control of the main control device through the circuit and comprising a plurality of signal control devices for performing call controls; a circuit connecting between the IP exchange and the lodgment; a back up exchange for detecting a trouble of the IP exchange or a fault of the circuit and backing up the lodgment; and a plurality of lodgments comprising a plurality of IP terminal, and performing a centralized control and operation of all the IP terminals by the IP exchange, wherein the circuit comprises the circuits of two systems, and the signal control device comprises LAN ports of two-system corresponding and connected to the circuits of two-system, and in case one of the LAN ports of two system develops a trouble during the operation, the signal control device is actuated by switching over to the other LAN port.

The circuit according to the fifth aspect of the present invention comprises two-system circuits, and the signal control device comprises two-system LAN ports corresponding and connected to the two-system circuits, and when one of the two-system LAN ports develops a trouble during actuation, the signal control device is actuated by switching over to the other LAN port, and therefore, even when a fault occurs during actuation of one of the two-system LAN ports connected to one of two-system circuits, the other of the two-system LAN ports connected to the other of two-system circuits can be actuated, so that the fault of the LAN ports is rescued and the operation of the system can be continued.

To achieve the fifth object, the IP telephone system according to the sixth aspect of the present invention is an IP telephone system comprising: a main control device for controlling the entire operation of the IP exchange; an IP exchange of the center storing a plurality of IP terminals for each lodgment by a control of the main control device through the circuit and comprising a plurality of signal control devices for performing call controls; a circuit connecting between the IP exchange and the lodgment; a back up exchange for detecting a trouble of the IP exchange or a fault of the circuit and backing up the lodgment; and a plurality of lodgments comprising a plurality of IP terminal, and performing a centralized control and operation of all the IP terminals by the IP exchange, wherein the signal control device comprises a spare signal control device not storing a plurality of IP terminals for each lodgment.

The signal control device according to the sixth aspect of the invention comprises the spare signal control device not storing a plurality of IP terminals for each lodgment, and therefore, even when the signal control device storing a plurality of IP terminals develops a trouble during the operation, the operation of the device can be continued by backing up the spare signal control device, so that an attempt can be made to enhance the reliability.

DETAILED DESCRIPTION OF THE INVENTION

An embodiment of the present invention will be described based on the accompanying drawings. Note that an IP telephone system of the present invention is adapted to the case of a large-scale business entity, for example, such as a megabank having a head office and a main office with branch offices and sub-offices located at each area where the IP exchange is installed in the head office taken as a center, and with each area taken as many lodgments, a plurality of IP terminals are installed in each area, and sales activities are conducted, and then, all the IP terminals installed at all the lodgments are stored in the IP exchange of a center through the circuit (network) of a WAN (Wide Area LAN) and the like, and the call control of all the IP terminals is executed by the IP exchange at the center, so that the centralized control of the telephone calls among all the IP terminals is performed.

Further, the IP telephone system of the present invention attempts redundancy or duplexing of the device or the circuit (network) and the like within the system, and performs a backup for a trouble or a fault, so that the reliability of the system is enhanced.

Figure 1:
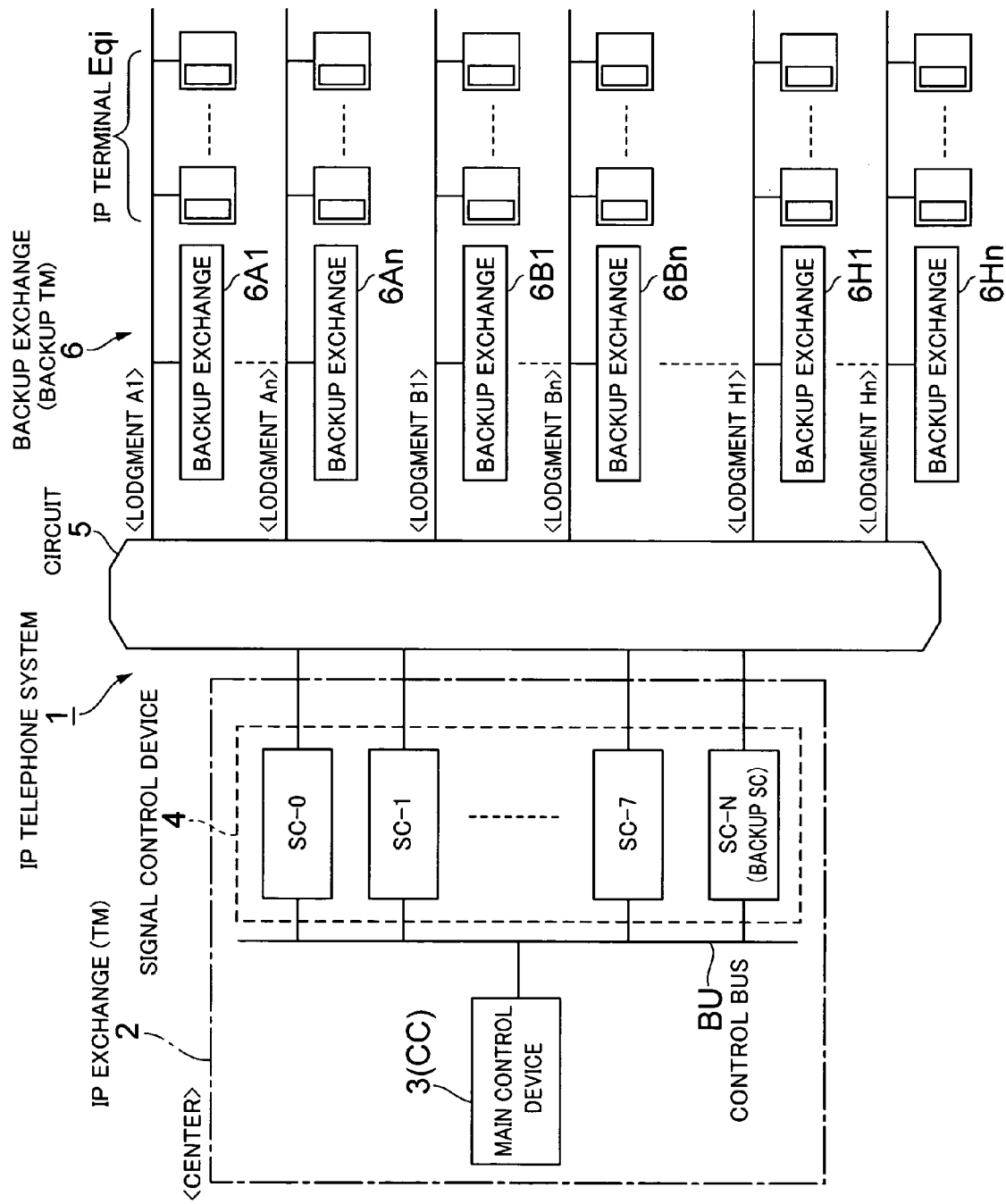
FIG. 1 is a block diagram showing one embodiment of an IP telephone system according to the present invention.

FIG. 1 is a block diagram showing one embodiment of an IP telephone system according to the present invention. In FIG. 1, an IP telephone system 1 is configured by an IP exchange 2 installed in the center, a backup exchange (B-TM) 6 installed at each of lodgments A1 to Hn, and a plurality of IP terminals Eqi, the circuit (network) 5 and the like such as a WAN which connects the IP exchange 2 of the center and all the lodgments A1 to Hn.

The IP exchange (TM) 2 comprises a main control device (CC) 3 for controlling the entire operations of the IP exchange (TM) 2, and a plurality of signal control devices 4 which store a plurality of IP terminals Eqi installed at each of the lodgments A1 to Hn through a circuit (network) 5 by a control of the main control device (CC) 3 and perform a call control.

The signal control device 4 is configured by SC-0 to SC-7 and SC-N (backup SC) connected through the main control device (CC) 3 and a control bus BU, and the SC-0 to SC-7 store the IP terminals Eqi of each of the lodgments A1 to Hn through the circuit (network) 5, and execute the call control of the IP terminals Eqi. Further, the SC-N (backup SC) does not store any IP terminals Eqi of the lodgments A1 to Hn when SC-0 to SC-7 are normal, and in case one set of the SC-0 to SC-7 develops a trouble, backs up the troubled SC-0 to the SC-7, and stores the IP terminals Eqi of the corresponding lodgments A1 to Hn.

A lodgment A is configured by lodgments A1 to An, and a lodgment B is configured by lodgments B1 to Bn, . . . a lodgment H is configured by lodgments H1 to Hn, and the lodgments A1 to Hn are connected to the circuit (network) through the relay network, respectively.

The IP terminals Eqi of the lodgments A1 to Hn are logged in to the SC-0 to SC-7 on startup so as to be stored in the SC-0 to SC-7, respectively.

The backup exchange (B-TM) 6 is connected to the LANs (Local Area Network) of the lodgments A1 to Hn, and comprises a backup exchange (B-TM) 6A1, a backup exchange (B-TM) 6A2, . . . a backup exchange (B-TM) 6Hn corresponding to each of the lodgments A1 to Hn, and is in a waiting state (waiting system) when the IP exchange 2 normally operates, and does not perform the call control of the IP terminal Eqi.

Further, the backup exchange (B-TM) 6A1, the backup exchange (B-TM) 6A2, . . . the backup exchange (B-TM) 6Hn are put into an operating state (operating system) when the relay network connected to each backup exchange develops a fault, and accept a log-in from the IP terminals Eqi in replace of the corresponding SC-0 to SC-7n, and perform the call control of the IP terminals Eqi, thereby enabling the telephone calls between the IP terminals Eqi inside the lodgments A1 to Hn.

Note that the IP telephone system is constructed of, for example, eight sets of the SC-0 to SC-7, and each of the SC-0 to SC-7 covers 16 lodgments, and one set SC can store 16 lodgments totaling 2000 sets of the IP terminals Eqi, and one system assumes a large-scale system capable of storing 16,000 sets of the IP terminals Eqi.

Figure 2:
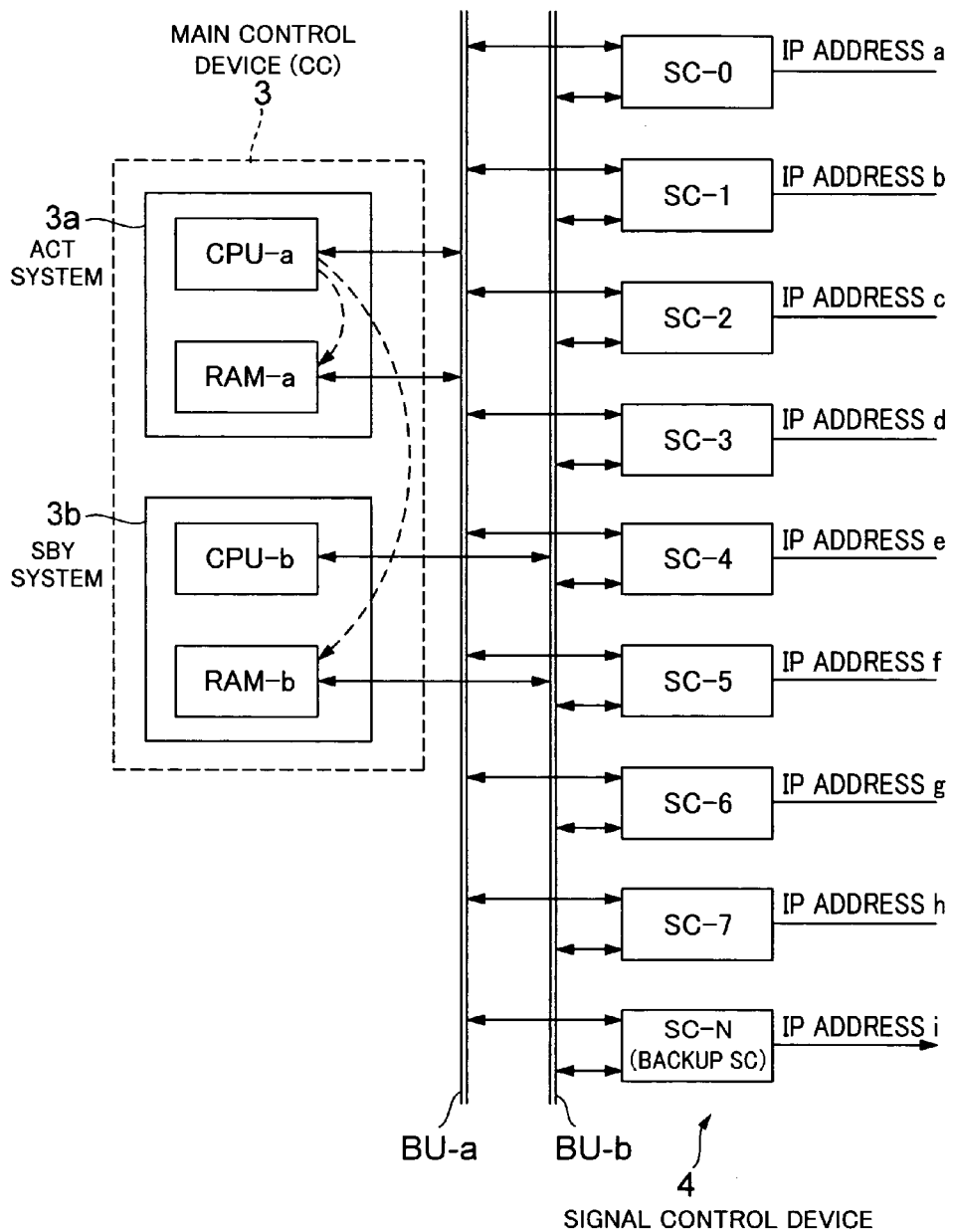
FIG. 2 is a connection diagram showing embodiments of a main control device and a signal control device according to the present invention.

FIG. 2 is a connection view showing the embodiments of the main control device and the signal control device according to the present invention. In FIG. 2, the main control device (CC) 3 turns the device into a duplexing structure, and comprises the main control device 3a of an operating system (ACT system) and the main control device 3b of a waiting system (SBY system).

The main control device 3a of the operating system (ACT system) is connected to the SC-0 to SC-7 and the SC-N (backup SC) comprising the signal control device 4 through a control bus BU-a, and the main control device 3b of the waiting system (SBY system) is connected to the SC-0 to SC-7 and the SC-N (backup SC) through a control bus BU-b.

The SC-0 to SC-7 and the backup SC are connected to both the control bus BU-a and the control bus BU-b, and are connected to the main control device 3a of the operating system (ACT system) through the control bus BU-a, and are connected to the main control device 3b of the waiting system (SBY system) through the control bus BU-b.

The main control device 3a of the operating system (ACT system) comprises a CPU-a and a RAM-a, and stores call processing information such as an IP addresses a to h of the SC-0 to SC-7 and the SC-N (backup SC), an IP address i, or station data, and the like, and controls the SC-0 to SC-7 and the SC-N (backup SC) through the control bus BU-a.

The main control device 3b of the waiting system (SBY system) comprises a CPU-b and a RAM-b, and always monitors the main control device 3a of the operating system (ACT system) when the main control device 3a of the operating system (ACT system) is operating, and replaces the main control device 3a so as to become the operating system (ACT system) from the waiting system (SBY system) when the trouble of the main control device 3a is detected, and controls the SC-0 to SC-7 and the SC-N (backup SC) through the control bus BU-b.

The main control device 3a of the operating system (ACT system) stores the call control information in the RAM-a, and stores it also in the RAM-b of the main control device 3b of the waiting system (SBY system), and promptly proceeds to the switchover to the main control device 3b when the main control device 3a develops a trouble.

In this manner, the main control device (CC) 3 according to the present invention comprises a duplexing structure of the operating system (main control device 3a) and the waiting system (main control device 3b), the waiting system (main control device 3b) downloads and stores the call control information of the operating system (main control device 3a), and in case the operating system (main control device 3a) develops a trouble, operates the waiting system (main control device 3b) as the operating system, and therefore, even when the operating system develops a trouble, the system does not breaks down, but can continuously operate, and can make an appeal for the reliability of the system.

The main control device (CC) 3 installs IP addresses a to h and an IP address i in the SC-0 to SC-7 and the SC-7 (backup SC) comprising the signal control device 4. For example, the main control device (CC) initializes the IP address a for the SC-0, the IP address b for the SC-1, the IP address c for the SC-2, the IP address d for the SC-3, the IP address e for the SC-4, the IP address f for the SC-5, the IP address g for the SC-6, the IP address h for the SC-7, and the IP address i for the SC-N (backup SC). Note that the IP addresses a to h can be installed arbitrarily in the SC-0 to SC-7 and the SC-7 (backup SC).

Further, the main control device (CC) 3 always performs an access confirmation with the SC-0 to SC-7 and the SC-N (backup SC), and for example, in case the access confirmation with SC-0 cannot be secured, it determines that the SC-0 is in a trouble.

Further, the main control device (CC) 3, when determining that the SC-0 is in a trouble, changes the IP address i of the SC-N (backup SC) to the IP address a of the SC-0 in which a trouble is developed, and executes a control for switching over the SC-0 in which develops a trouble is developed to the SC-N (backup SC).

The signal control device (SC) 4 is configured by the SC-0 to the SC-7 and SC-N (backup SC), and comprises a CCI/F which is an interface with the main control device (CC) 3, a control portion (CPU), a maintenance portion for detecting and notifying a trouble, and a LAN port which is an interface with the circuit (network) 5, and the like, respectively.

The SC-0 to SC-7 of the signal control device (SC) 4 is installed with the IP addresses a to h from the main control device (CC) 3, thereby configuring an operating system, and becomes a log-in destination based on the IP addresses a to h from the IP terminal Eqi for each of the lodgments A to H, and accepts the IP address of the IP terminal Eqi for each of the logged-in lodgments A to H, thereby storing the IP terminal Eqi for each of the lodgments A to H.

In this manner, the signal control device (SC) 4 according to this invention stores a plurality of IP terminals Eqi based on the log-in from a plurality of IP terminals Eqi of each of the lodgments A to H, and therefore, can specify a plurality of stored IP terminals Eqi and execute a call control, and can perform a centralized control of all the IP terminals Eqi of the system by the IP exchange 2 of the center.

The SC-N (backup SC) of the signal control device (SC) 4 is installed with an IP address i from the main control device (CC) 3, thereby configuring a waiting system (backup system), and does not store any of the IP terminal Eqi of each of the lodgments A to H.

When a trouble is developed on one set of the SC-0 to SC-7 (for example, SC-0), the IP address i of the SC-N (backup SC) is changed to the IP address a of the SC-0 by a control of the main control device (CC) 3, and after that, the SC-N (backup SC) is switched over to the operating system from the waiting system as the SC-0.

At this time, the SC-N (backup SC) takes over the IP address also of the IP terminal Eqi which is logged in the SC-0, and stores and operates the IP terminal Eqi of the lodgment A, and continuously executes the call control of the IP terminal Eqi of the lodgment A.

In this manner, since the signal control device 4 according to the present invention comprises a spare signal control device 4 (SC-N: backup SC) not storing a plurality of IP terminals Eqi in each of the lodgments A to H, even when the signal control device 4 (for example, SC-0) storing a plurality of IP terminals Eqi during operation develops a trouble, it is backed up by the spare signal control device (SC-N) so as to continue the operation of the device, and the enhancement of the reliability can be attempted.

Further, since the signal control device (SC-0 to SC-7) and the spare signal control device (SC-N: backup SC) according to the present invention have the IP addresses (IP addresses a to h and IP address i) designated by the main control device 3, respectively, the spare signal control device (SC-N) can be switched over to the signal control device (SC-0) during operation by changing the IP addresses (Ip addresses I→a), and the operation can be continued without stopping the operation of the signal control device (SC-0).

On the other hand, the SC-0 which develops a trouble, after being repaired, is installed with the IP address i by the control from the main control device (CC) 3, and becomes the SC-N (backup SC) and comes to a spare system, and next time, deals with the trouble of the SC-0 to SC-7 of the operating system.

Note that the SC-0 which develops a trouble, after being repaired, takes over the IP address a from the SC-0 (previous backup SC) during operation by a control of the main control device (CC) 3 and the IP address of the IP terminal Eqi of the lodgment A, and becomes the SC-0 again to start the operation, and installs the IP address i in the SC-0 (previous backup SC) during operation and can restore it to the SC-N (backup SC).

In this manner, since the signal control device (for example, SC-0) in which a trouble is developed according to the present invention, after being repaired, is set as the spare signal control device SC-N (backup SC), it can continuously deal with the trouble of the signal control device (SC-0 to SC-7) during operation, and the backup can be realized by the spare signal control device (backup SC) without installing the same number of backup devices as all the signal devices 4 during operation.

Figure 3:
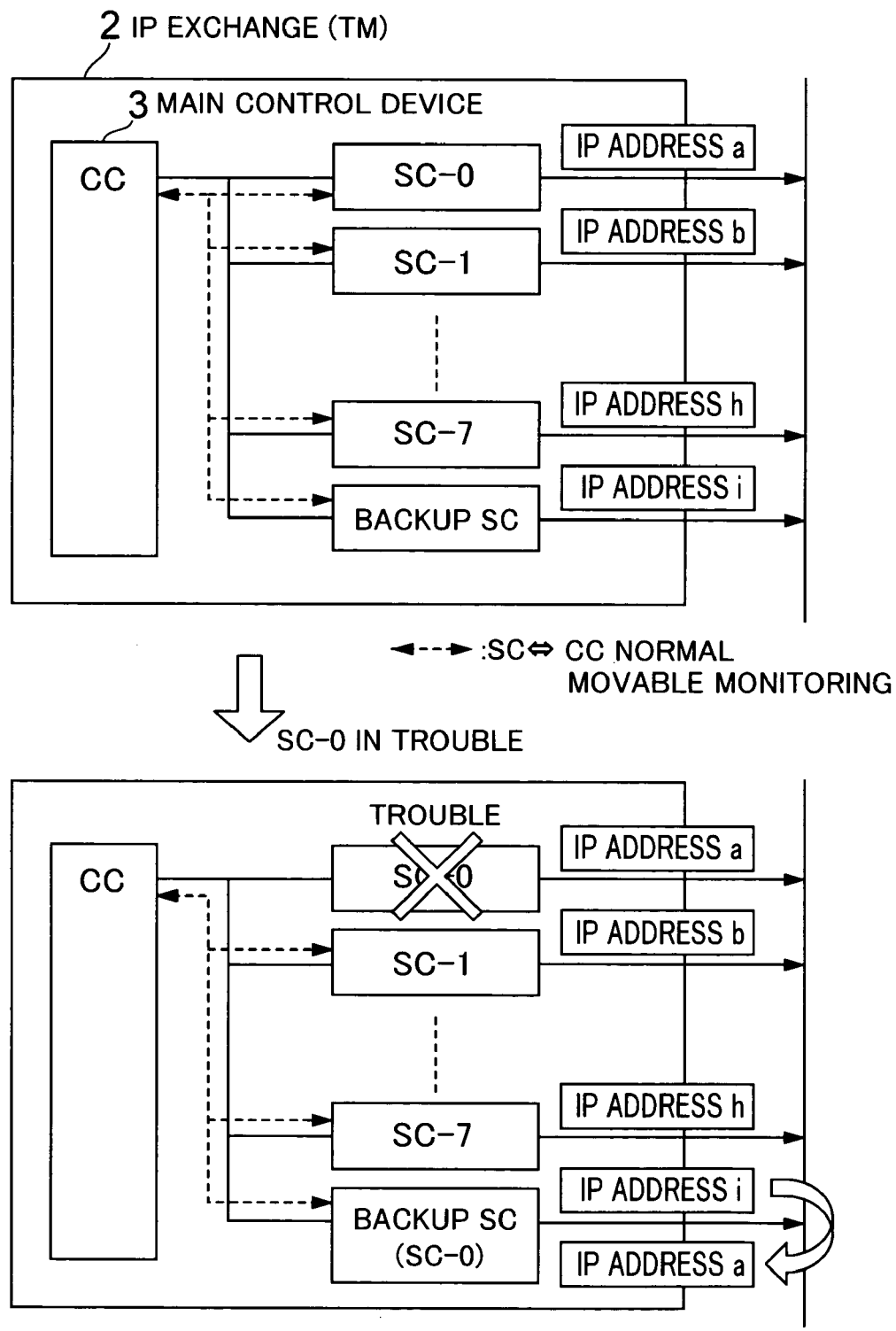
FIG. 3 is an explanatory drawing showing one embodiment of the switching of the signal control device according to the present invention.

FIG. 3 is an explanatory drawing of one embodiment of the switchover of the signal control device according to the present invention. In FIG. 3, the SC-0 to SC-7 configuring the signal control device 4 are during operation by the IP addresses a to h, respectively, and stores the IP terminals Eqi of the lodgments A to H through the circuit (network) 5, and performs the call control of the IP terminals Eqi.

On the other hand, though the SC-N (backup SC) is waiting at the IP address i, it is in a state capable of storing the IP terminal Eqi of any one of the lodgments A to H.

The SC-0 to SC-7 and the SC-N (backup SC) perform an access confirmation of a normal operation monitor (shown by the broken line) mutually with the main control device (CC) 3.

In case a trouble is developed on one set (for example SC-0) of the SC-0 to 0SC-7 during operation, the access confirmation between the main control device (CC) 3 and the SC-0 cannot be secured, and therefore, the main control device (CC) 3, upon detection of the trouble of the SC-0, changes the IP address i of the SC-N (backup SC) to the IP address a of the SC-0 in which the trouble is developed, and switches over the SC-0 in which a trouble is developed to the SC-N (backup SC) and allows the SC-N (backup SC) to operate as the SC-0.

In this manner, since the signal control device 4 according to the present invention performs the access confirmation with the main control device (CC) 3, even when a trouble is developed in the signal control device (for example, SC-0) during operation, having no access confirmation is determined as having a trouble in the signal control device, and the spare signal control device (SC-N: backup SC) can be switched over to the signal control device (SC-0) during operation, and the switchover of the spare signal control device can be efficiently realized.

Further, the spare signal control device 4 (SC-N: backup SC) according to the present invention, in case a trouble is developed in one set signal control devices 4 (for example, SC-0) during operation, by a control of the main control device (CC) 3, changes the IP address i of its own (SC-N) to the IP address a of the signal control device 4 (SC-0) in which a trouble is developed, and takes over the IP addresses of a plurality of IP terminals Eqi which are logged in the signal control device 4 (SC-0) in which a trouble is developed, and therefore, can easily switch over the spare signal control device (backup SC) to the signal control device 4 (SC-0) during operation.

Note that the main control device (CC) 3, in case the SC-0 is switched over to the SC-N (backup SC), realizes the switching over only by checking (rebooting) the minimum initial conditions necessary for the operation of the SC-N (backup SC) and therefore, the switching time is shortened, and the effect accompanied with the switchover of the SC-0 and the SC-N (backup SC) is controlled to the minimum, and the operation of the SC-0 is continued.

In this manner, the main control device (CC) 3 according to the present invention, when switching over to the spare signal control device (backup SC), checks the minimum initial condition, and shortens the switching over time, and therefore, can switch over the signal control device 4 (SC-0) in which a trouble is developed to the spare signal control device 4 (SC-N) in the shortest possible time, and the operation of the system can be continued.

Figure 4:
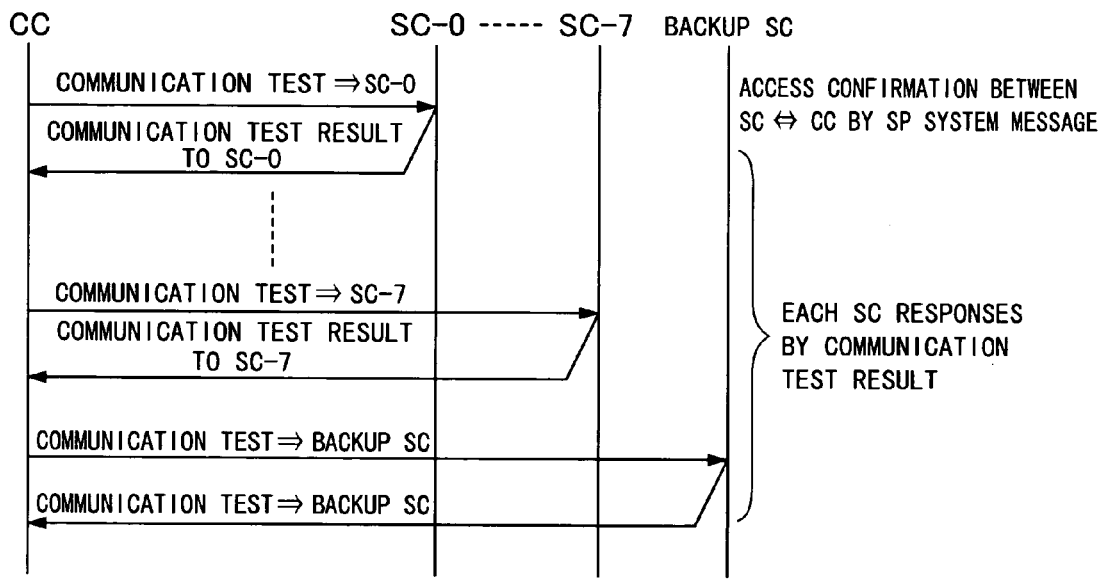
FIG. 4 is an access confirmation actuation sequence view showing one embodiment of the signal control device according to the present invention.

FIG. 4 is an access confirmation actuation sequence view showing one embodiment of the signal control device according to the present invention. FIG. 4 shows a case where the SC-0 to SC-7 during operation of the signal control device (SC) 4 are in a normal state. The access confirmation is performed among the main control device (CC) 3 and the SC-0 to SC-7 and the SC-N (backup SC).

The main control device (CC) 3 transmits a communication test to the SC-0 to SC-7 and the SC-N (backup SC), and receives a communication test result transmitted from the SC-0 to SC-7 and the SC-N (backup SC), thereby determining that no trouble develops in the SC-0 to SC-7 and the SC-N (backup SC).

Figure 5:
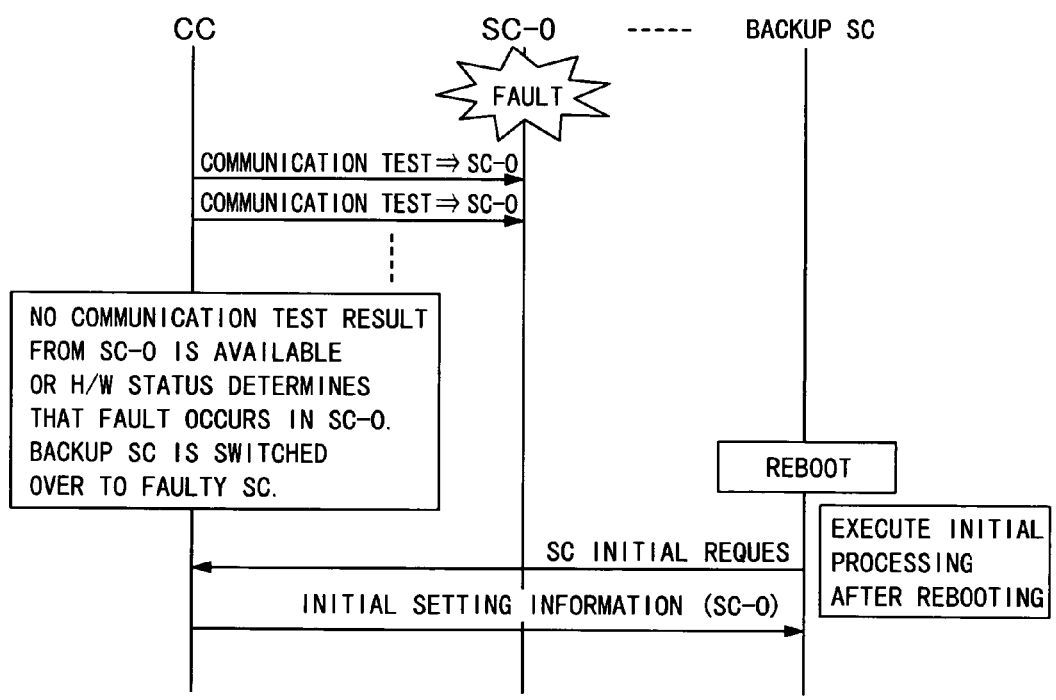
FIG. 5 is an access confirmation actuation sequence view showing another embodiment of the signal control device according to the present invention.

FIG. 5 is an access confirmation actuation sequence view showing another embodiment of the signal control device according to the present invention. FIG. 5 shows a case where a trouble (fault) develops in the signal control device 4 (SC-0) of the operating system. In this state, no matter how many times the communication test is transmitted to the SC-0 from the main control device (CC) 3, the main control device (CC) 3 is unable to receive the communication test result from the SC-0, and the access confirmation between the main control device (CC) 3 and the SC-0 can be no longer secured.

The main control device (CC) 3 determines that the SC-0 develops a trouble (fault), and switches over the SC-N (backup SC) to the SC-0 having developed the fault. The SC-N (backup SC) reboots (restart), and transmits a SC initial request to the main control device (CC) 3.

The main control device (CC) 3, upon receipt of the SC initial request from the SC-N (backup SC), transmits the minimum initial setting information to the SC-N (backup SC), and allows the SC-N (backup SC) to start operation as the SC-0 within the shortest period of time.

In this manner, the main control device (CC) 3 according to the present invention performs the access confirmation with a plurality of signal control devices (SC) 4, and in case the access confirmation with the corresponding signal control device (for example, SC-0) cannot be secured, determines it as having a trouble, and therefore, can execute the detection of the trouble of the signal control device during operation by having no access confirmation, and can easily determine the signal control device during operation.

Figure 6:
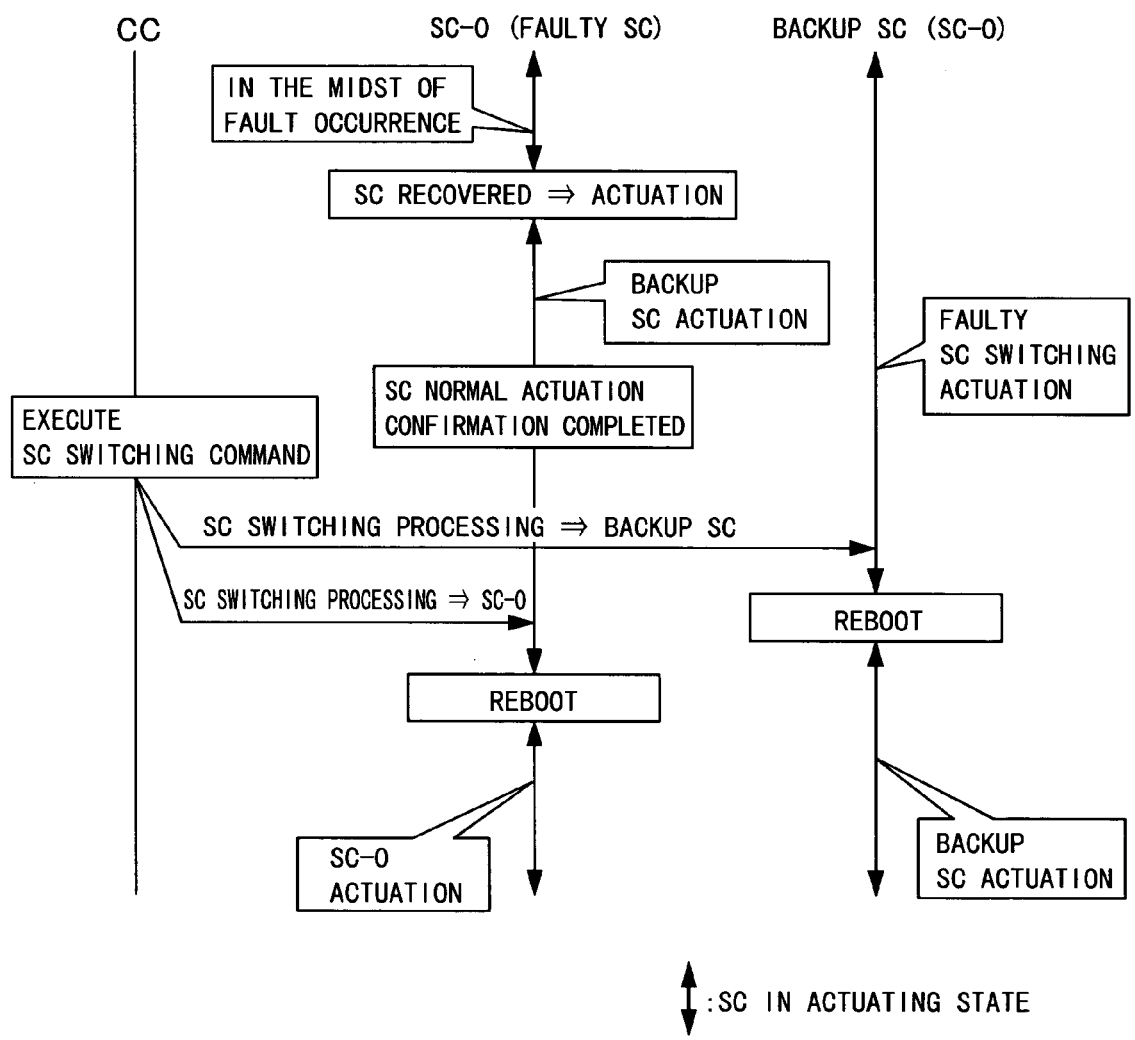
FIG. 6 is a switching actuation sequence view showing one embodiment of the signal control device according to the present invention.

FIG. 6 is a switchover actuation sequence view showing one embodiment of the signal control device according to the present invention. In FIG. 6, a fault develops in the SC-0, and after that, a recovery process is executed, and it is operated as the backup SC. On the other hand, due to the fault occurred in the SC-0, the backup SC is switched over to the SC-0 and operates as the operating system.

In this state, a SC switchover command is executed by the main control device (CC) 3, and when a command of the SC switchover processing is transmitted to both the SC-0 and the backup SC, the SC-0 (waiting as the backup SC) and the backup SC (operating as the SC-0) reboot, and the SC-0 is switched back to the SC-0 (operating system) prior to the fault (trouble), and the backup SC is restored to the backup SC (waiting system) anterior to the occurrence of the fault (trouble).

In this manner, the main control device (CC) 3 according to the present invention installs the IP addresses (IP addresses a to i) in a plurality of signal control devices 4 (SC-0 to SC-7 and the SC-N), and in case a trouble is developed in one set signal control device (SC-0), switches over the IP address i of the spare signal control device (SC-N) to the IP address a of the signal control device (SC-0) in which a trouble is developed, and performs a control of switching over the signal control device (SC-0) in which the trouble is developed to the spare signal control device (SC-N), and therefore, even if the signal control device during operation develops a trouble, the operation can be continued by switching over to the spare signal control device, and the reliability of the system operation can be enhanced.

Next, the duplexing of the LAN port of the signal control device according to the present invention will be described. The SC-0 to SC-7 and the SC-N (backup SC) configuring the signal control device 4 comprises LAN ports of two systems of an A system port PHY0 of the operating system and a B system port PHY1 of the waiting system, and a CPU controlling the switchover of the LAN ports of the two systems.

The A system port PHY0 is connected to an A system network of two system circuits (networks) 5 through the LAN, and the B system port PHY1 is connected to a B system network of two system circuits (networks) 5 through the LAN.

The A system network is connected with a GW (gateway) 7a, and the B system network is connected with a GW (gateway) 7b.

Further, the SC-0 to SC-7 and the SC-N (backup SC) are connected to the main control device (CC) 3 through a control bus BU, and transmit a layer 1 fault occurrence notice and a fault recovery notice to the main control device (CC) 3.

When the A system port PHY0 connected to the A system network of the signal control device 4 (for example, SC-0) develops a fault, the fault occurrence notice is transmitted to the main control device (CC) 3 from the CPU, and the A system port PHY0 is switched over to the B system port PHY1 so as to be connected to the B system network, thereby continuing the operation.

When a layer 1 fault is developed during actuation of the A system port PHY0, the IP address and a MAC address of the A system port PHY0 are taken over by the B system port PHY1, and are switched over to the B system port PHY1 to be actuated (operated), and the A system port PHY0 is backed up by the B system port PHY1.

Figure 7:
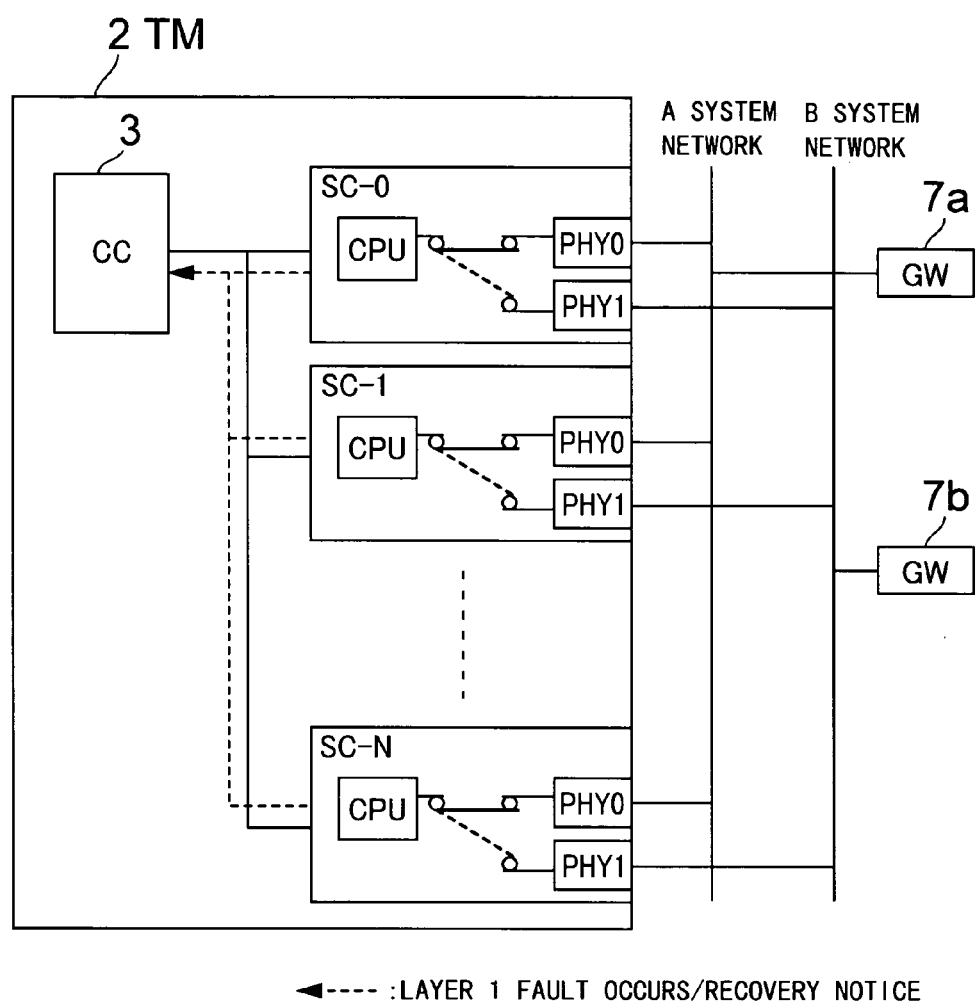
FIG. 7 is a port switching explanatory drawing showing one embodiment of the signal control device according to the present invention.

FIG. 7 is a port switchover explanatory drawing showing one embodiment of the signal control device according to the present invention. In FIG. 7, the signal control device 4 is configured by the SC-0 to SC-7 and the SC-N (backup SC), and comprises the A system port PHY0 (operating system) connected to the A system network of the circuit (network) 5 and the B system port PHY1 (waiting system) connected to the B system network, respectively.

When the layer 1 fault is detected during the operation of the A system port PHY0 (operating system), the CPU switches over the A system port PHY0 to the B system port PHY1 (shown by the solid line→the broken line) and sets the A system port PHY0 as the operating system, and executes the call control of the corresponding IP terminals Eqi of the lodgments A to H are executed through the B system network from the B system port PHY1.

On the other hand, when the layer 1 fault of the A system port PHY0 is recovered, the B system port PHY1 is switched over to the A system port PHY0 (shown by a broken line→a solid line) by a control of the CPU, and is switched back to the operating System or the B system port PHY1 is not switched back, but is set as the operating system, and the A system port PHY0 is set as the waiting system.

Figure 8:
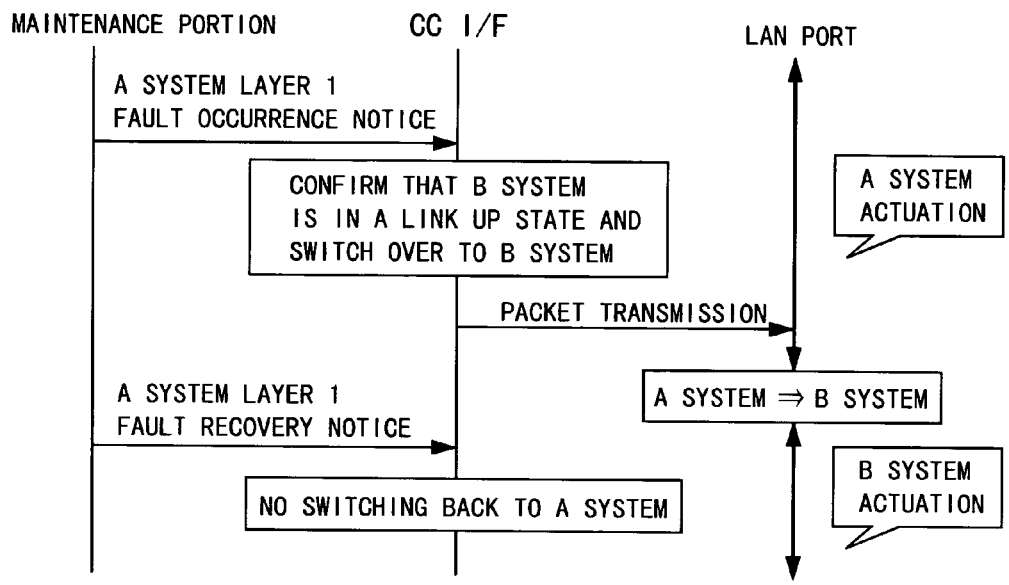
FIG. 8 is a switching sequence view showing one embodiment of a LAN port according to the present invention.

FIG. 8 is a switchover sequence view showing one embodiment of the LAN port according to the present invention. In FIG. 8, when the layer 1 fault is developed during the operation in the A system port PHY0, the A system layer 1 fault occurrence notice is transmitted to a CCI/F from a maintenance portion, and the CCI/F confirms that the B system is in a link-up state, and transmits an instruction for switchover to the B system port PHY1 to the B system port PHY1 by a packet.

The LAN port having received the packet from the CCI/F is switched over from the A system port (A system port PHY0) to the B system port (B system port PHY1), and is operated and actuated by the B system port.

On the other hand, during actuation in the B system port PHY1, even if the A system layer 1 fault recovery notice is transmitted to the CCI/F from the maintenance portion, the CCI/F does not perform the switchback of the A system port PHY0, and the LAN port continues the actuating operation by the B system port PHY1.

Figure 9:
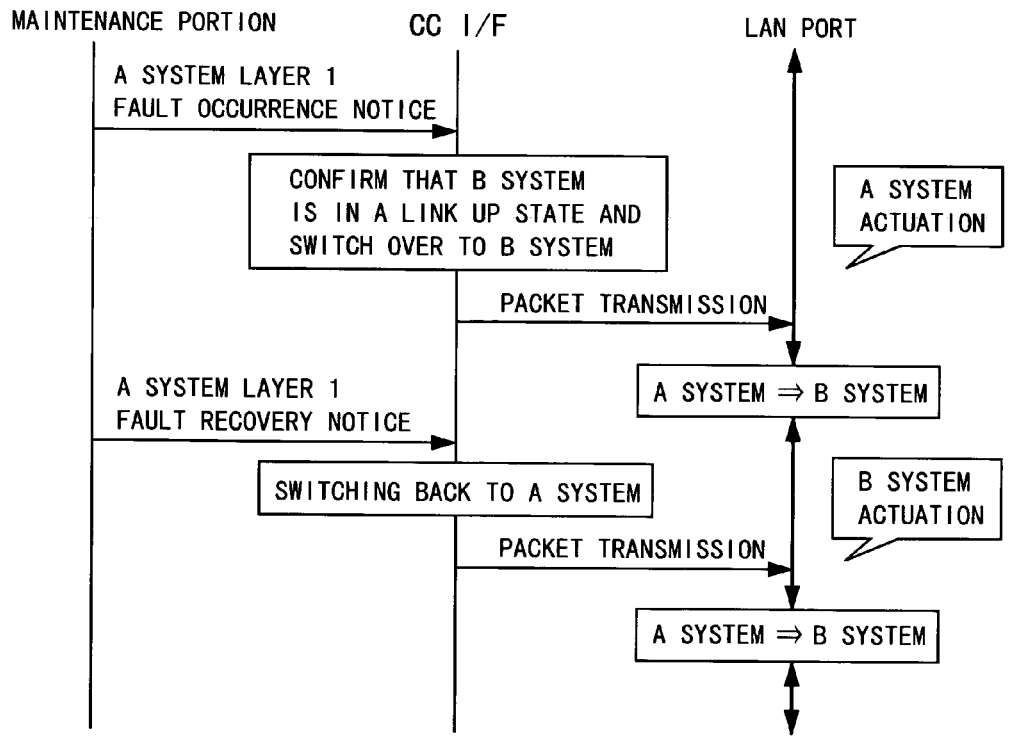
FIG. 9 is a switching sequence view showing another embodiment of a LAN port according to the present invention.

FIG. 9 is a switchover sequence view showing another embodiment of the LAN port according to the present invention. FIG. 9 is the same as FIG. 8 in that the layer 1 fault occurs in the A system port PHY0, and the LAN port is switched over from the A system port (A system port PHY0) to the B system port (B system port PHY1), and operates and actuates by the B system port.

When the A system layer 1 fault recovery notice is transmitted to the CCI/F from the maintenance portion during the operation in the B system port PHY1, the CCI/F performs the switchback of the A system port PHY0, and transmits the instruction for the switchover to the A system port PHY0 to the A system port PHY0 by a packet, and the LAN port switches over (switches back) to the A system port (A system port PHY0) from the B system port (B system port PHY1), and operates (actuates) at the A system port.

In this manner, the circuit 5 according to this invention comprises two system circuits (A system network and B system network), and the signal control device 4 (SC-0 to SC-7 and the SC-N) comprises two system LAN ports (A system port PHY0 and B system port PHY1) corresponding and connected to the two system circuits, respectively, and in case one of the two system LAN ports (A system port PHY0) develops a fault during its operation, it is switched over to another LAN port (B system port PHY1) and is actuated, and therefore, even when a fault occurs during the operation of one (A system port PHY0) of the two system LAN ports connected to one of the two system circuits, the other (B system port PHY1) of the two system LAN ports connected to another of two system circuits can be actuated, so that the fault of the LAN ports can be saved and the operation of the system can be continued.

Further, the signal control device 4 according to the present invention, when a layer 1 fault occurs during the operation of one LAN port (A system port PHY0), since the IP address and the MAC address of one LAN port (A system port PHY0) are taken over by the other LAN port (B system port PHY1), and are switched over to the other LAN port (B system port PHY1) and actuated, the fault of the LAN ports can be backed up and the reliability of the system can be secured.

Subsequently, the backup exchange of the lodgment according to the present invention will be described. At each lodgment of the IP telephone system, a backup exchange 6 (backup exchanges 6A1 to 6Hn shown in FIG. 1) is provided for each lodgment (lodgments A1 to Hn shown in FIG. 1).

The backup exchange (B-TM) 6 is in a waiting state (waiting system) in a normal operating state in which no fault exists in an IP exchange (TM) 2 or the circuit (network) 5 except for the actuation of a unicast-multicast conversion to be described later, and performs an access confirmation with each of the signal control devices (SC) 4 (SC-0 to SC-7) of the affiliated IP exchanges 2.

Further, the backup exchange (B-TM) 6 is also in a state not taking care of a plurality of IP terminals Eqi belonging to the lodgment (for example, lodgment A) to which it belongs.

Further, the backup exchange (B-TM) 6, at the abnormal time of the trouble of the IP exchange (TM) 2 or the fault of the circuit (network) 5, is switched over from the waiting state (waiting system) to the operating state (operating system), and backs up the extension telephone calls of the IP terminals Eqi inside the lodgment.

The switchover from the waiting state (waiting system) to the operating state (operating system) is executed in case the access confirmation from the IP exchange 2 (signal control device 4) cannot be secured due to the abnormality of the trouble of the IP exchange (TM) 2 or the fault of the circuit (network) 5.

On the other hand, the restoring from the operating state (operating system) to the waiting state (waiting system) is executed in case the abnormality of the trouble of the IP exchange (TM) 2 or the fault of the circuit (network) 5 is recovered and the access confirmation from the IP exchange 2 (signal control device 4) is secured again.

In this manner, the backup exchange (B-TM) 6 according to the present invention performs the access confirmation with the signal control device (SC-0 to SC-7) 4 storing a plurality of IP terminals Eqi of the lodgment, and in case the access confirmation from the signal control device (SC-0 to SC-7) 4 cannot be secured, determines it as the occurrence of the fault of the IP exchange (TM) 2 or the fault of the circuit (network) 5, and switches over from the waiting state to the operating state, and therefore, can easily and certainly detect the fault of the system, and can smoothly proceed to the extension telephone calls of the IP terminals inside the lodgment.

The backup exchange (B-TM) 6, at the abnormal time of the trouble of the IP exchange (TM) 2 or the fault of the circuit (network) 5, is put into the operating state (operating system), and accepts the IP addresses logged-in from the IP terminals Eqi inside the lodgment, and performs the call control of the extension telephone calls among all the IP terminals Eqi inside the corresponding lodgment (for example, lodgment A).

Further, the backup exchange (B-TM) 6, when the trouble of the IP exchange (TM) 2 or the fault of the circuit (network) 5 is recovered, switch over to the waiting state (waiting system) so that all the IP terminals Eqi inside the lodgment (for example, lodgment A) are logged out, and stops the call control of the extension telephone calls among all the IP terminals Eqi inside the corresponding lodgment (for example, lodgment A).

All the IP terminals Eqi inside the lodgment, at the normal time of the IP exchange (TM) 2 or the circuit (network) 5 when the backup exchange 6 is in the waiting system, transmit the IP addresses to the IP exchange 2 (signal control device 4) and long in there, and perform telephone calls by a control of the IP exchange 2 (signal control device 4).

Further, all the IP terminals Eqi inside the lodgment, at the abnormal time of the IP exchange (TM) 2 or the circuit (network) 5 when the backup exchange 6 is in the operating system, log out from the IP exchange 2 (signal control device 4), and transit the IP addresses to the backup exchange 6 and log in there, and perform the extension telephone calls inside the lodgment by a control of the backup exchange 6.

Further, all the IP terminals Eqi inside the lodgment, at the time of restoring from the abnormality of the IP exchange (TM) 2 in which the backup exchange 6 restores to the waiting system or the circuit (network) 5, log out from the backup exchange 6, and transmit the IP addresses to the IP exchange 2 (signal control device 4) and log in there, and perform the telephone calls inside the system by a control of the IP exchange 2 (signal control device 4).

Further, the IP terminal Eqi monitors a life check from the IP exchange 2 (signal control device 4), and when there is no life check and time is up, logs out from the IP exchange 2 (signal control device 4), and transmits the IP address to the backup exchange 6 and logs in there.

Further, the IP terminal Eqi monitors a life check from the backup exchange 6, and where there is no life check and time is up, logs out from the backup exchange 6, and transmits the IP address to the IP exchange 2 (signal control device 4) and logs in there.

In this manner, a plurality of IP terminals Eqi according to the present invention, in case a life check from the signal control device (SC-0 to SC-7) 4 cannot be received, determine it as an occurrence of the fault of the IP exchange (TM) 2 or the fault of the circuit, and after having logged out from the signal control device (SC-0 to SC-7) 4, transmit the IP addresses to the backup exchange (B-TM) 6 and log in there, and therefore, proceed from the control of the IP exchange (TM) 2 of the center to the control of the backup exchange (B-TM) 6 of the lodgment, and can receive the extension telephone services inside the lodgment, and can make an appeal for an ease of operation.

Figure 10:
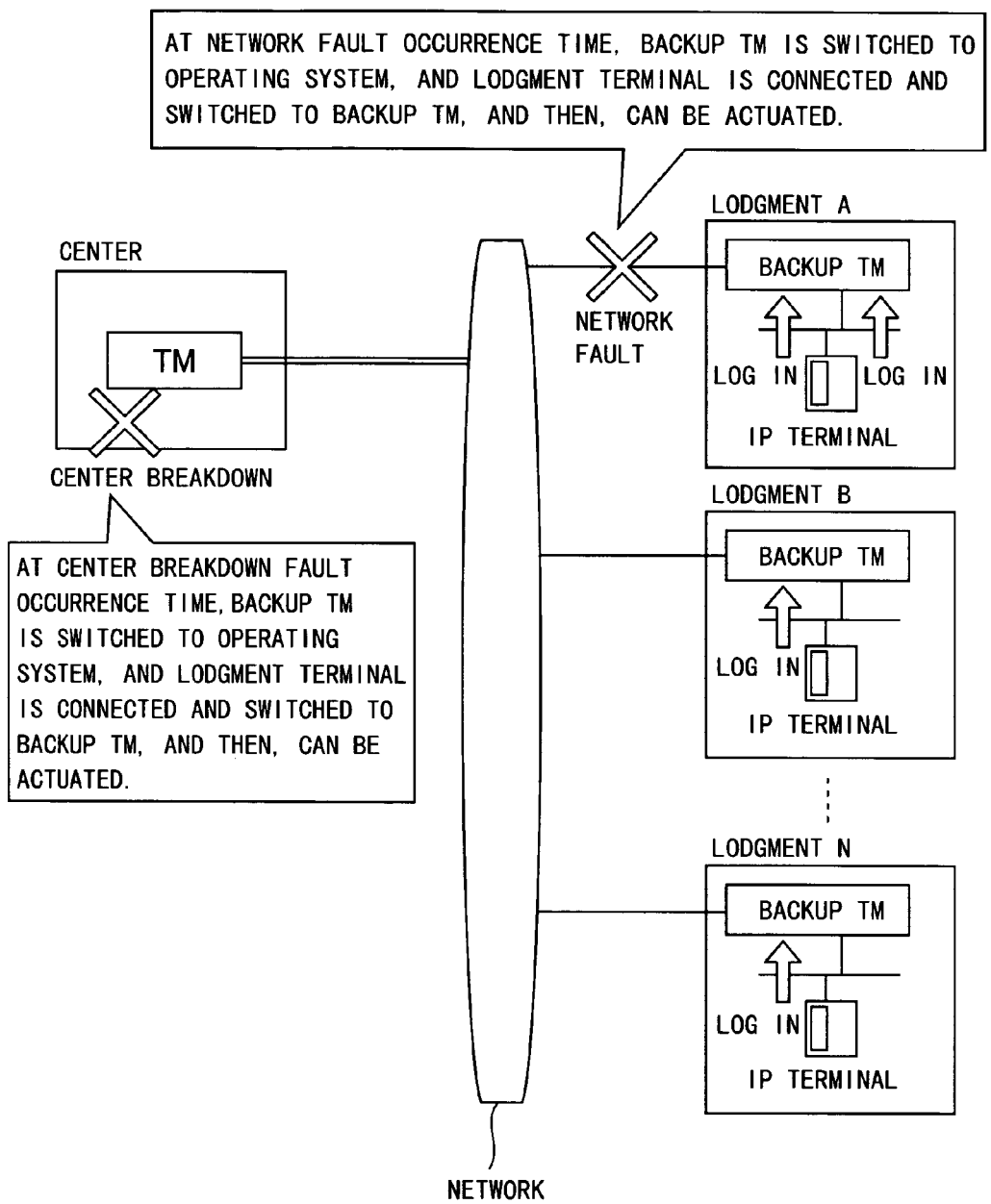
FIG. 10 is an actuation schematic view showing one embodiment of a backup exchange according to the present invention.

FIG. 10 is an actuation schematic diagram showing one embodiment of the backup exchange according to the present invention. In FIG. 10, the backup exchanges 6 (backup TM) of the lodgment A, the lodgment B, ... and the lodgment N are stored in the IP exchange (TM) 2 of the center through the circuit (network) 5. Note that inside the lodgment A, the lodgment B, ... and the lodgment N, there exist a plurality of IP terminals Eqi, respectively.

At the normal time when no fault exists in the IP exchange (TM) 2 and the circuit (network) 5, all the IP terminals Eqi inside the lodgment A, the lodgment B, ... and the lodgment N transmit the IP addresses to the IP exchange (TM) 2 and log in there, and perform the telephone calls among all the IP terminals Eqi by a control of the IP exchange (TM) 2.

In a first case, when a trouble is developed at the IP change (TM) 2 from the normal time of this system, all the backup exchanges 6 (backup TM) inside the lodgment A, the lodgment B, ... and the lodgment N are switched over from the waiting system to the operating system, and all the IP terminals Eqi inside the lodgment A, the lodgment B, ... and the lodgment N also log out from the IP exchange (TM) 2, and transmit the IP addresses to the backup exchanges 6 (backup TM) inside own lodgment, respectively and log in there, and the telephone calls inside own lodgment are made possible by a control of the backup exchange 6 (backup TM).

Further, in a second case, when a fault is developed in the network connected with the lodgment A from the normal time of the system, the backup exchange 6 (backup TM) of the lodgment A is switched over from the waiting system to the operating system, and all the IP terminals Eqi of the lodgment A log out from the IP exchange (TM) 2, and transmit the IP addresses to the backup exchange 6 (backup TM) inside the lodgment A and log in there, and the telephone calls inside the lodgment A are made possible by a control of the backup exchange 6 (backup TM)

On the other hand, all the IP terminals Eqi inside the lodgment B, ... , and the lodgment N perform the telephone calls among all the IP terminals inside the lodgment B, ... , and the lodgment N by a control of the IP exchange (TM) 2. Note that, in case an abnormality is simultaneously developed in the IP exchange (TM) 2 and the network, the phenomenon is the same as the first case.

In this manner, the backup exchange (B-TM) 6 according to the present invention accepts the IP address logged in from a plurality of IP terminals Eqi, and switches over the operations of a plurality of IP terminals Eqi by a control of the IP exchange (TM) 2 to the operations of a plurality of IP terminals Eqi by a control inside the lodgment, and therefore, even in the worst case of the trouble of the IP exchange (TM) 2 of the center and the fault of the circuit (network) 5, can backup the extension telephone calls of the IP terminals inside the lodgment, and can make an attempt at enhancement of the usability.

Next, the sequence actuation of the backup exchange of the lodgment according to the present invention will be described. The backup exchange 6 (backup TM) of each lodgment comprises an actuation sequence switching over from the waiting system to the operating system and an actuation sequence switching back from the operating system to the waiting system.

Figure 11:
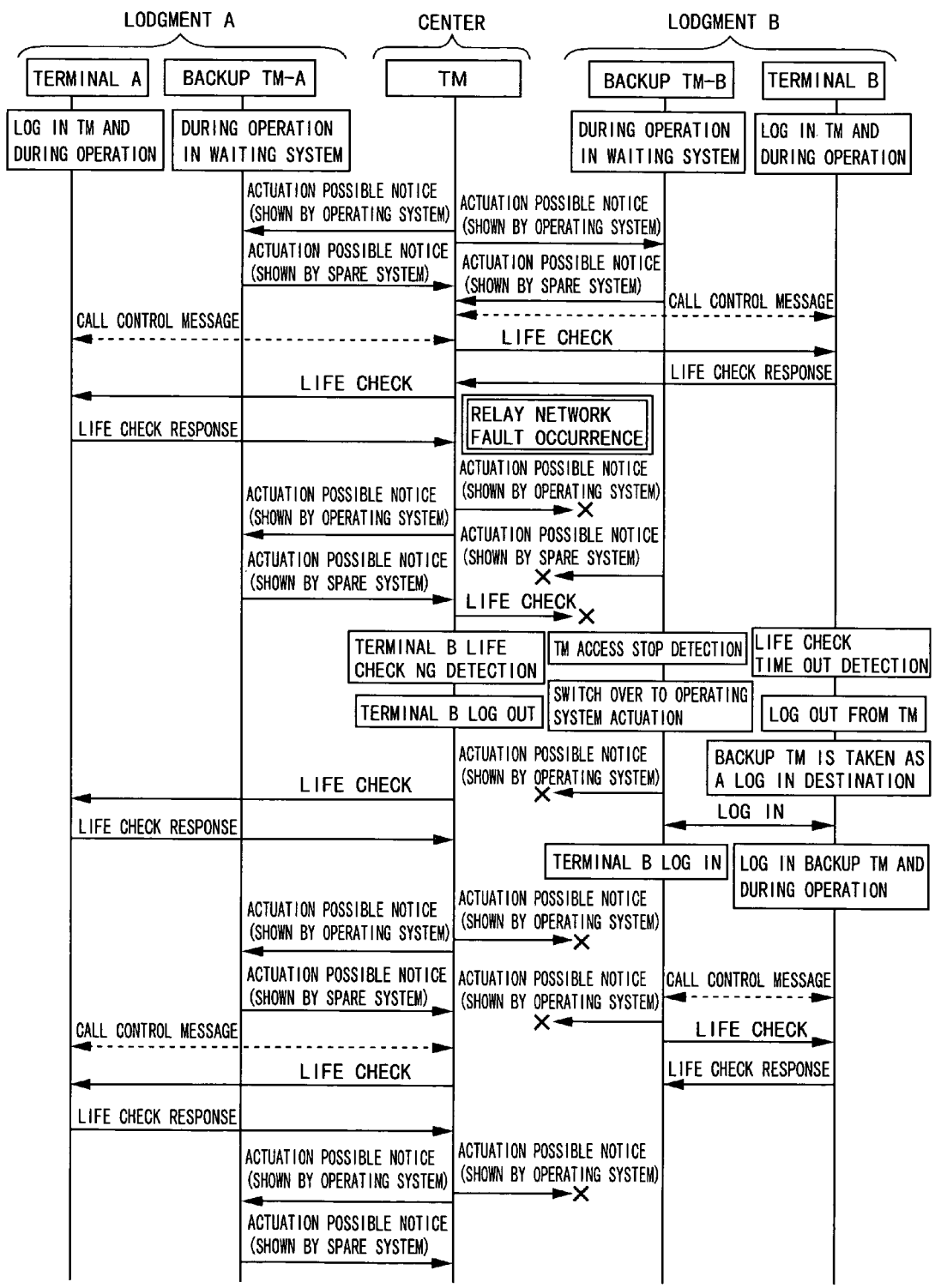
FIG. 11 is an actuation sequence view from a waiting system to an operating system showing one embodiment of the backup exchange according to the present invention.

FIG. 11 is an actuation sequence view from the waiting system to the operating system showing one embodiment of the backup exchange according to the present invention. Note that a description will be made on the actuation sequence among the backup exchange 6 (backup TM-A) and the IP terminal Eqi (terminal A) of the lodgment A, the IP exchange (TM) 2 of the center, and the backup exchange 6 (backup TM-B) of the lodgment B, and the IP terminal Eqi (terminal B).

In case the TM of the center and the network are normal, the terminal A of the lodgment A and the terminal B of the lodgment B are in [TM log-in operations] of the center, respectively, and the terminal A and the terminal B exchange [call control messages] (dial call origination, transfer, incoming, and the like) with the TM, and monitor a life check from the TM, and transmit [life check responses] to the TM.

On the other hand, the backup TM-A of the lodgment A and the backup TM-B of the lodgment B are in [operations by the waiting system], and transmit [actuation possible notices (shown by the spare system)] to the TM, and receive the [actuation possible notice (shown by operating system)] from the TM, thereby executing the access confirmation between the backup TM-A of the lodgment A and the TM, and between the backup TM-B of the lodgment B and the TM.

When a fault is developed in a relay network (network) connecting the TM and the lodgment B from this state, the backup TM-B of the lodgment B is unable to receive the [actuation possible notice (shown by the operating system)] from the TM of the center, and [detects TM access cutoff], and therefore, executes the [switchover to operating system (actuation) operation].

On the other hand, the terminal B of the lodgment B is unable to receive a [life check] from the TM of the center, and [detects a life check time out], and [logs out from the TM], and after that, [logs in] with [the backup TM-B as a log in destination], so that the backup TM-B of the lodgment B accepts the [log-in of the terminal B].

At this point of time, the TM of the center detects [terminal B life check NG], and recognizes [terminal B log out].

When the backup TM-B of the lodgment B restored to the operating system accepts the [log-in of the terminal B], the terminal B is [during a log-in operation to the backup TM-B], and exchanges [call control messages] (dial call origination, transfer, incoming, and the like) with the backup TM-B, so that the extension telephone calls inside the lodgment B are made possible.

After that, the terminal B monitors a [life check] from the backup TM-B, and transmits [life check responses] to the backup TM-B.

On the other hand, the backup TM-A and the terminal A in the lodgment A in which no fault exists in the relay network (network) are during operation with the backup TM-A actuating in the waiting system and the terminal A logged in the TM during operation.

In this manner, the backup exchange 6 (backup TM-B) according to the present invention performs the access confirmation with the IP exchange (TM) 2 in a waiting state, and provides an actuation sequence for switching over to an operating state in case the access confirmation from the IP exchange (TM) 2 cannot be secured, is, and therefore, when the trouble of the IP exchange (TM) 2 of the center and the fault of the circuit (network) 5 occur, the waiting state is switched over to the operating state, and the backup exchange 6 can backup the extension telephone calls of the IP terminal (terminal B) inside the lodgment B, and can secure the extension telephone call services of the IP terminal inside the lodgment.

Further, the backup exchange 6 (backup TM-B) according to the present invention accepts the log in from the IP terminal Eqi (terminal B) inside the corresponding lodgment (lodgment B) in an operating state, and provides an actuation sequence capable of the telephone calls between the IP terminals inside the lodgment, and therefore, even in the worst case of the trouble of the IP exchange (TM) 2 of the center and the fault of the circuit (network) 5, can provide the extension telephone call services inside the lodgment and can make an appeal for usability.

Figure 12:
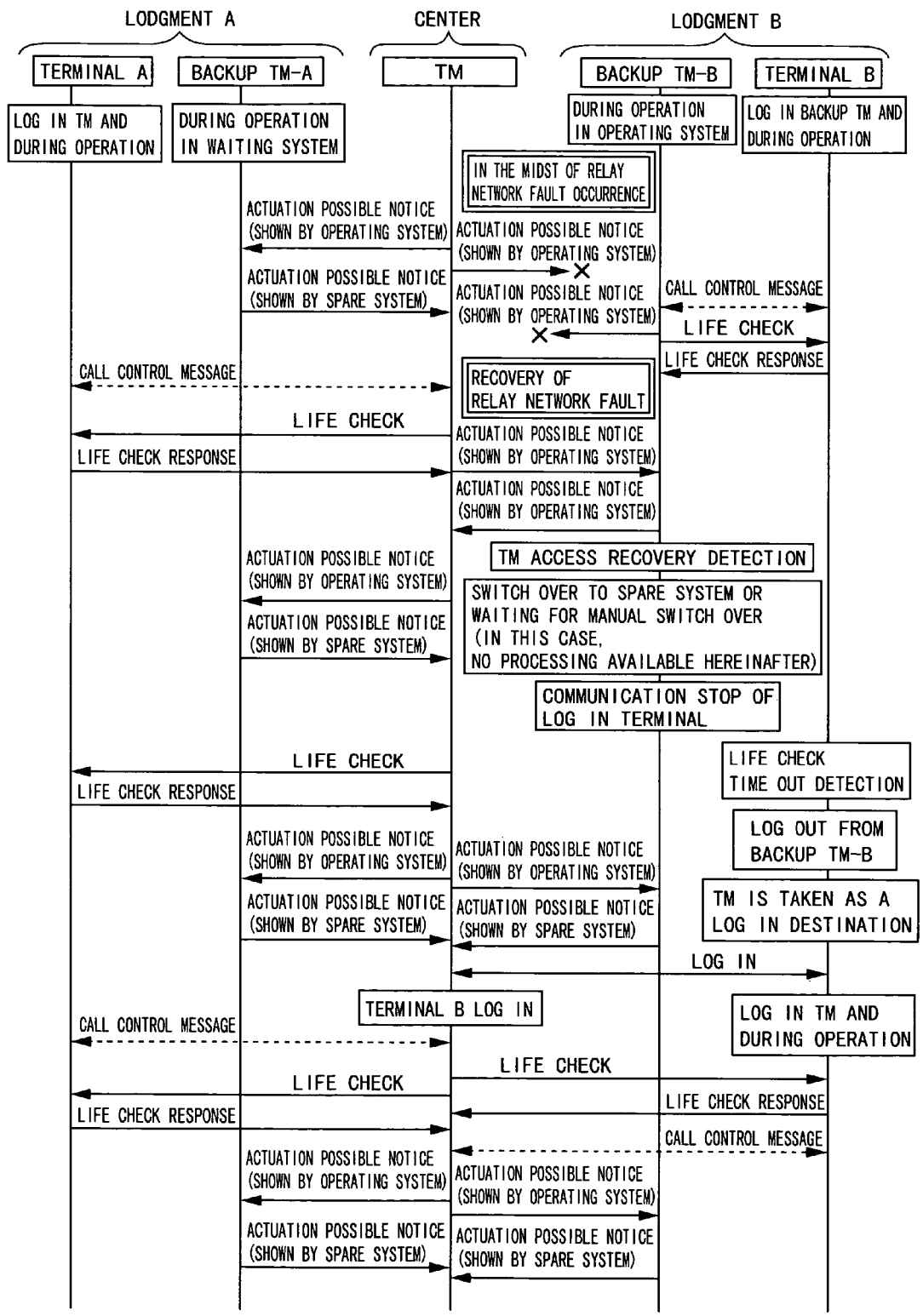
FIG. 12 is an actuation sequence view from the operating system to the waiting system showing one embodiment of the backup exchange according to the present invention.

FIG. 12 is an actuation sequence view from the operating system to the waiting system showing one embodiment of the backup exchange according to the present invention. Note that, similarly to FIG. 11 of the actuation sequence, a description will be made on the actuation sequence among the backup exchange 6 (backup TM-A) and the IP terminal Eqi (terminal A), the IP exchange (TM) 2 of the center, and the backup exchange 6 (backup TM-B) of the lodgment B and the IP terminal Eqi (terminal B).

Further, the backup exchange 6 (backup TM-A) of the lodgment A and the IP terminal Eqi (terminal A) have the same actuation sequences as that of FIG. 11 since no fault occurs in the relay network (network) connecting the lodgment A and the IP exchange (TM) 2 of the center, and therefore, a description will be made on the actuation sequence among the backup exchange 6 (backup TM-B) of the lodgment B and the IP terminal Eqi (terminal B), and the IP exchange (TM) 2 of the center.

Since a fault occurs in the relay network (network) connecting the TM and the lodgment B, the backup TM-B is [during actuation by the operating system], and the terminal B is [logged in the backup TM-B and during operation].

The terminal B exchanges [call control messages] (dial call origination, transfer, incoming, and the like) with the backup TM-B, and monitor a [life check] from the backup TM-B, and transmits the [life check responses] to the backup TM-B.

When the fault of the relay network (network) connecting the TM and the lodgment B is recovered from this state, the backup TM-B of the lodgment B receives the [actuation possible notice (shown by the operating system)] from the TM, and transmits the [actuation possible notice (shown by the operating system)] to the TM so as to restart the access confirmation between the backup TM-B of the lodgment B and the TM, and [detects recovery of the access with the TM].

Subsequently, the backup TM-B of the lodgment B is switched back to [switchover to spare system operation], and executes a [communication stop of log-in terminal (terminal B)].

After that, the backup TM-B of the lodgment B receives a [actuation possible notice (shown by the operating system)] from the TM, repeats transmitting a [actuation possible notice (shown by the spare system)] to the TM.

On the other hand, the terminal B, when the backup TM-B is switched back to the spare system, is unable to receive the life check from the backup TM-B, and when the [life check time out is detected], [loges out from the backup TM-B] and [takes the TM as a log-in destination], and [logs in] the TM, and is [operated while being logged in the TM]. In this state, the terminal B of the lodgment B can make the telephone calls inside the system.

The TM, when accepting the long-in from the terminal B, transmits the [life check] to the terminal B, and receives the [life check response] from the terminal B, and confirms the normality, and exchanges [call control messages] (dial call origination, transfer, incoming, and the like) with the terminal B, and controls the telephone calls with the terminal B.

On the other hand, the backup TM-B receives the [actuation possible notice (shown by the operating system)] from the TM, and transmits the [actuation possible notice (shown by the waiting system)] to the TM, thereby executing the access confirmation with the TM.

In this manner, the backup exchange 6 (backup TM-B) according to the present invention, in case the access confirmation is restarted from the IP exchange (TM) 2 in the operating state, provides the actuation sequence for switching over to the waiting state, and therefore, can be restored to the waiting state when the trouble of the IP exchange (TM) 2 of the center and the fault of the circuit (network) 5 are recovered, thereby making the service of the system possible.

Further, the IP terminal Eqi (terminal B) according to the present invention monitors the life check from the IP exchange (TM) 2 or the backup exchange 6 (backup TM-B), and detects the time out of the life check, and after logging out from the IP exchange (TM) 2 or the backup exchange 6 (backup TM-B), provides an actuation sequence to log in to the backup exchange 6 (backup TM-B) or the IP exchange (TM) 2, and therefore, can be connected to the IP exchange or the backup exchange according to the system environment, and can provide the telephone calls inside the system or the extension telephone calls inside the lodgment.

Subsequently, a relay system of a common message communication of the IP telephone system will be described. The IP telephone system 1 of the present invention assumes a large number of sets (for example, 16,000 sets for the entire system) for the IP terminal Eqi installed at each lodgment, and when the common message such as ramp information and the like from the IP exchange 2 is transmitted to the IP terminal of the lodgment, the lodgment for transmitting the common message from the IP exchange (TM) 2 is designated, and the common message is transmitted to the lodgment by the unicast message, and the unicast message is converted into a multicast message inside the lodgment, and the multicast message is transmitted to all the IP terminals Eqi.

Figure 13:
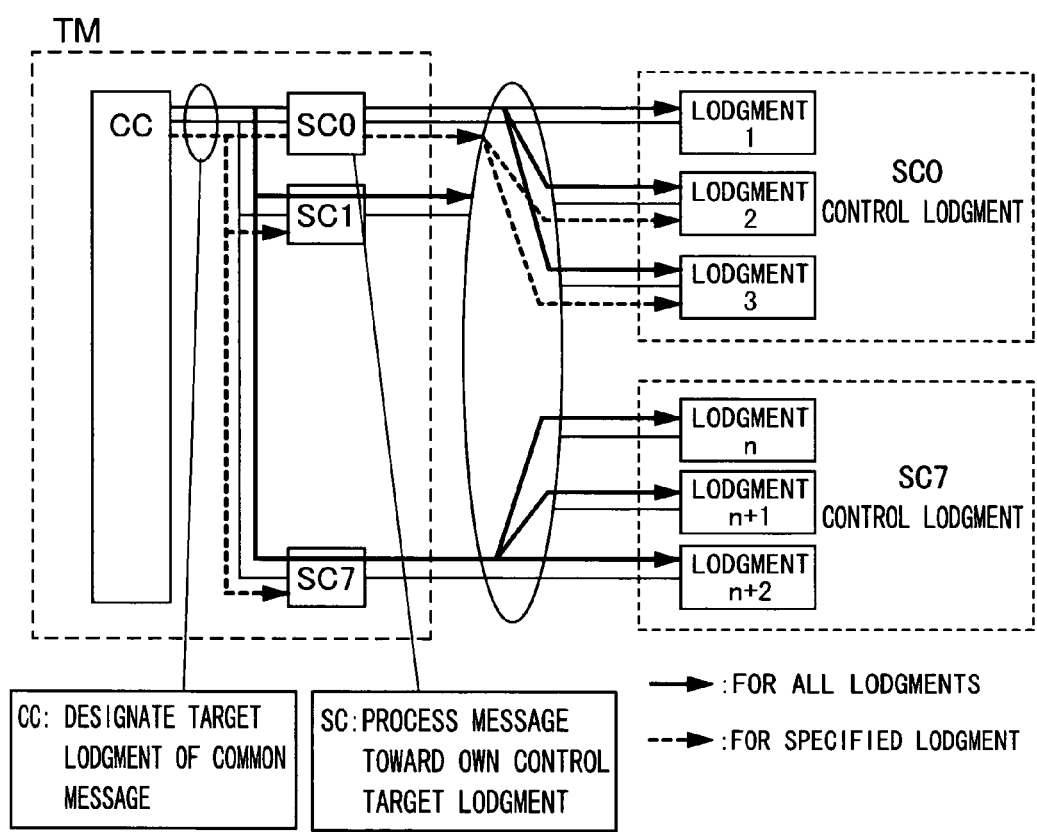
FIG. 13 is a relay system view showing one embodiment of a common message communication according to the present invention.

FIG. 13 is a relay system view showing one embodiment of the common message communication according to the present invention. Note that a state of transmitting the common message by the multicast message (shown by the solid line) will be also shown as a reference. In FIG. 13, the common message is transmitted to the IP terminal Eqi inside the lodgment by the route of each lodgment from the main control device (CC) 3 of the IP exchange (TM) 2→the signal control device 4 (SC-0 to SC-7) of the IP exchange (TM) 2→the circuit (network) 5.

First, in case the common message is transmitted to all the lodgments (all the IP terminals Eqi of the system) by the multicast message (shown by the solid line), the multicast message is transmitted from the main control device (CC) 3 to the signal control device 4 (SC-0 to SC-7), and the multicast message is transmitted also from the signal control device 4 (SC-0 to SC-7) to all the lodgments through the circuit (network) 5, and thus, the multicast message is transmitted to all the IP terminals Eqi (not shown) from all the lodgments.

Next, in case the common message is transmitted to all the IP terminals Eqi of the lodgment designated by the unicast message (shown by the broken line), the unicast message designating the transmission destination (lodgment) is selectively transmitted from the main control device (CC) 3 to the signal control device 4 (for example, SC-0 to SC-7), and the unicast message is transmitted from the SC-0 and the SC-7 to the designated lodgments 1 to 3 (control lodgments of SC-0) and the lodgments n to n+2 (control lodgments of SC-7) through the circuit (network) 5. The lodgments 1 to 3 and the lodgments n to n+2 convert the unicast message into the multicast message, and the converted multicast message is transmitted to all the IP terminals Eqi (not shown) inside the lodgments 1 to 3 and the lodgments n to n+2, respectively.

The unicast message designating the transmission destination (lodgment) is set up based on a bitmap described with the transmission destination by the main control device (CC) 3.

Further, since the lodgment is designated, the data amount of the unicast message transmitting the circuit (network) 5 can be reduced.

The conversion from the unicast message to the multicast message is performed in such a manner that the backup exchange 6 (multicast converter=backup TM) and an IP-CONV (IP converter) 8 provided in the lodgment perform a multicast conversion processing, and from the backup exchange 6 (multicast converter=backup TM) or the IP-CONV (IP converter) 8, the multicast message is transmitted to all the IP terminals Eqi inside the corresponding lodgment.

The backup exchange 6 (multicast converter=backup TM) is connected to the operating system (A system) of the duplexed circuit (network) 5, and receives the unicast message transmitted from the signal control device 4 (SC-0 to SC-7) storing the lodgments, and converts the unicast message into the multicast message and transmits it to the IP terminal Eqi inside the lodgment. Note that the backup exchange 6, during operation of the circuit of the operating system (A system), is put into the waiting system, and only when it is in the waiting system, the backup exchange 6 operates as a multicast converter for performing the unicast-multicast conversion.

Further, the backup exchange 6 (multicast converter=backup TM) performs the access confirmation with the signal control device 4 (SC-0 to SC-7) of the IP exchange (TM) 2 storing own device through the circuit (network) 5 of the operating system (A system).

The IP-CONV (IP converter) 8 is connected to the waiting system (B system) of the duplexed circuit (network) 5, and in case the backup exchange 6 (multicast converter=backup TM) develops a trouble or the operating system (A system) of the circuit (network) 5 develops a fault, backs up the backup exchange 6, and receives the unicast message transmitted from the signal control device 4 (SC-0 to SC-7) storing the lodgments, and converts the unicast message into the multicast message, and transmits it to the IP terminals Eqi inside the lodgment.

Further, the IP-CONV (IP converter) 8 performs the access confirmation with the signal control device 4 (SC-0 to SC-7) of the IP exchange (TM) 2 storing own device through the circuit (network) 5 of the waiting system (B system).

In this manner, since the IP exchange 2 according to the present invention designates the lodgments (lodgments A to H) and selectively transmits the unicast message of the common message to them, it can control the data amount of the common message transmitting on the circuit (network) 5, and can reduce the loads of the IP exchange 2 and the circuit (network) 5, and can make an attempt at efficiency and power saving of the system.

Figure 14:
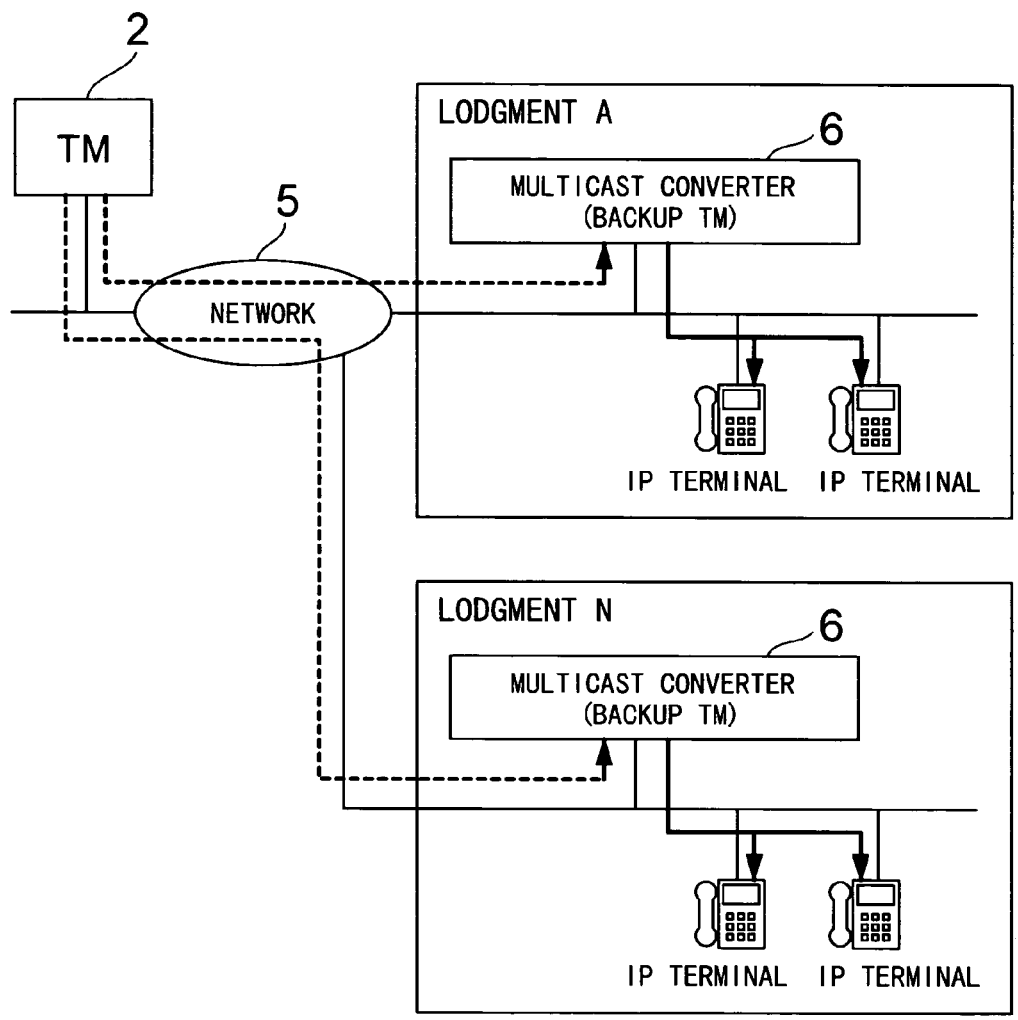
FIG. 14 is a unicast-multicast conversion explanatory drawing showing an embodiment of a multicast converter (backup exchange) according to the present invention.

FIG. 14 is a unicast-multicast conversion explanatory drawing showing the embodiment of the multicast converter (backup exchange) according to the present invention. In FIG. 14, the multicast converters (backup exchange) 6 of the lodgments A and H receive the common message such as ramp information and the like from the IP exchange (TM) 2, respectively by the unicast message (shown by the broken line) through the circuit (operating system of the network) 5, and subject the unicast message to multicast message conversion processing, and provide the converted multicast message (shown by the solid line) to all the IP terminals Eqi inside each lodgment (lodgments A and N).

In this manner, a plurality of lodgments (lodgments A to H) according to the present invention comprise the backup exchanges (multicast converter) 6, which are connected to the circuit 5 of the operating system (A system) and receive the unicast message to convert it into the multicast message and transmit the multicast message to a plurality of IP terminals Eqi inside the lodgments (lodgments A to H), and therefore, the multicast messages for the number of IP terminals inside the lodgment are generated from one unicast message, and the common message can be transmitted to all the IP terminals inside the lodgment, so that the data amount transmitting the circuit of the operating system can be reduced.

Figure 15:
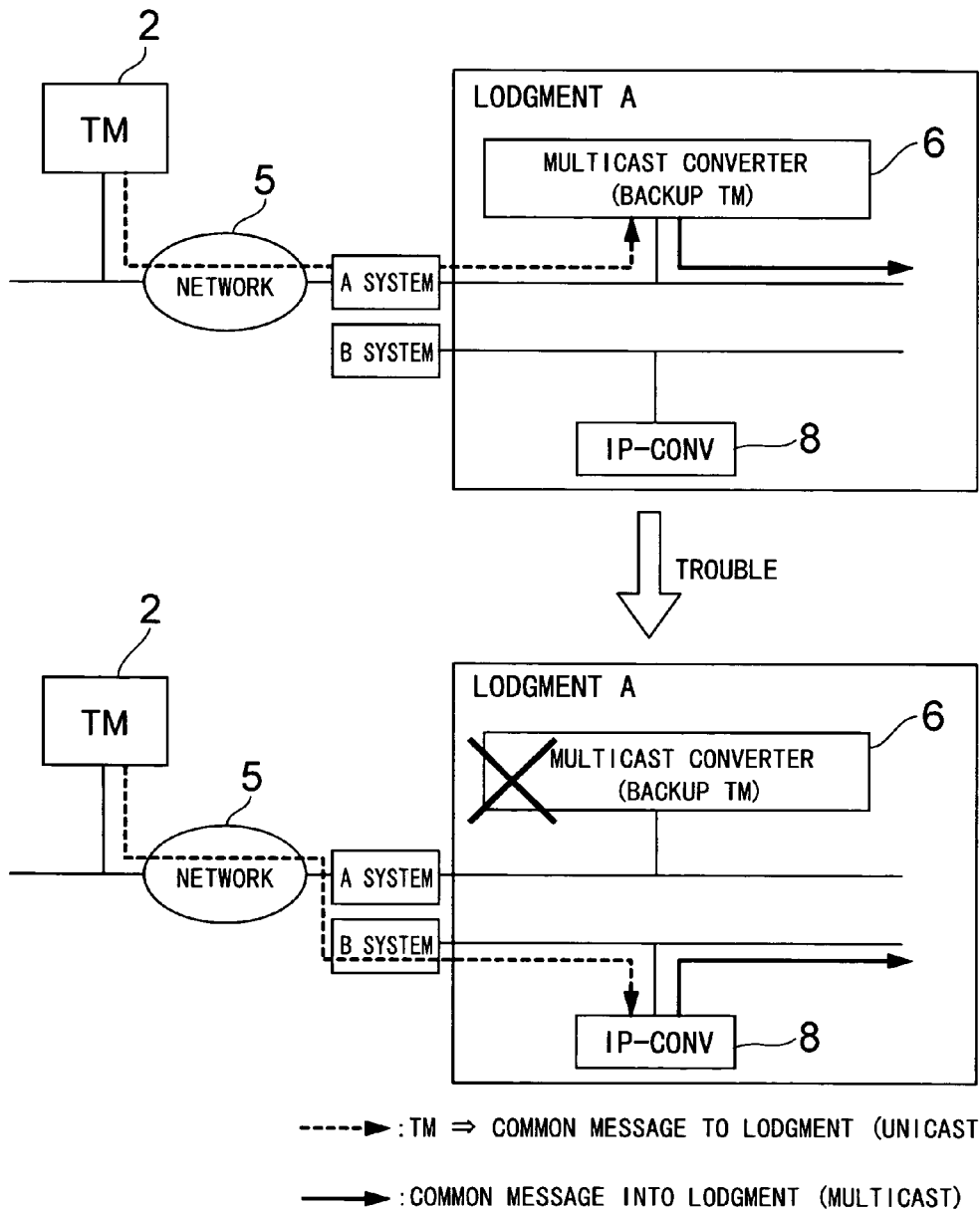
FIG. 15 is a lodgment multicast operation backup explanatory drawing of one embodiment of the IP converter according to the present invention.

FIG. 15 is a lodgment multicast operation backup explanatory drawing showing one embodiment of the IP converter according to the present invention. In FIG. 15, inside the lodgment A, the multicast converter 6 is connected to the operating system (A system) of the circuit (network) 5, and receives the common message from the IP exchange (TM) 2 by the unicast message (shown by the broken line), and provides it to all the IP terminals Eqi inside the lodgment A by the multicast message (shown by the solid line).

On the other hand, though the IP-CONV (IP converter) 8 is connected to the operating system (B system) of the circuit (network) 5 and is put into an operating state, because the unicast message is not transmitted from the IP exchange (TM) 2 through the operating system (B system) circuit, it is put into an action stop state.

From this state, when the multicast converter 6 develops a trouble and the unicast-multicast conversion fails, the IP exchange (TM) 2 is unable to secure the access confirmation from the multicast converter 6, and therefore, it detects the trouble of the multicast converter 6, and with the waiting system (B system) of the circuit (network) 5 taken as the operating system, transmits the unicast message (shown by the broken line) to the IP-CONV (IP converter) 8 through the waiting system (B system).

The IP-CONV (IP converter) 8, upon receipt of the unicast message (shown by the broken line) through the waiting system (B system) of the circuit (network) 5, subjects the unicast message (shown by the broken line) to the multicast conversion processing, and provides the converted multicast message (shown by the solid line) to all the IP terminals Eqi inside the lodgment A.

By the duplexing of the operating system (A system) and the waiting system (B system) of the circuit (network) 5, and the duplexing of the multicast converter 6 and the unicast-multicast converter of the IP-CONV (IP converter) 8, the multicast message operation inside the lodgment can be secured.

Note that, in FIG. 15, a description has been made on the lodgment A, this is the same as all the lodgments of the lodgments A1 to Hn shown in FIG. 1.

In this manner, a plurality of lodgments (lodgments A to H) according to the present invention comprise the IP converter (IP-CONV) 8, which is connected to the circuit (network) 5 of the waiting system (B system) and receives the unicast message to convert it into the multicast message and transmits the multicast message to a plurality of IP terminals Eqi inside the lodgments, and therefore, the multicast messages for the number of IP terminals inside the lodgment are generated from one unicast message, and the common message can be transmitted to all the IP terminals inside the lodgment, so that the data amount transmitting the circuit of the operating system can be reduced.

Next, the switching over operation from the multicast converter to the IP-CONV (IP converter) and the switching back operation from the IP-CONV (IP converter) to the multicast converter in the common message communication will be described. Note that the IP exchange 2, the multicast converter, and the IP-CONV (IP converter) 8 will be represented by TM, B-TM, and IP-CONV.

Figure 16:
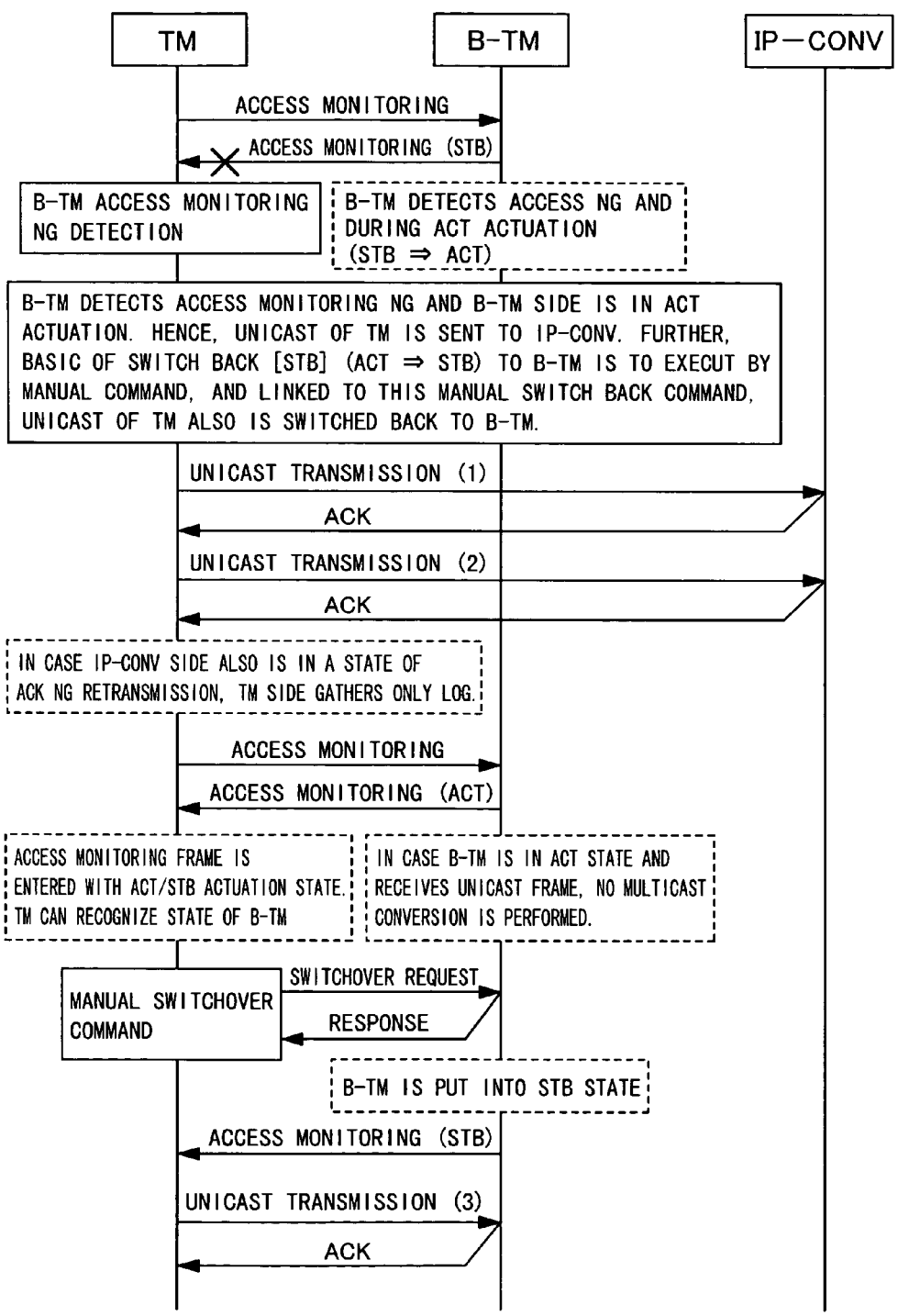
FIG. 16 is an actuation flow chart showing one embodiment of the common message communication according to the present invention.

FIG. 16 is an actuation flow chart showing one embodiment of the common message communication according to the present invention. In FIG. 16, while the TM sends an [access monitoring] to the B-TM, it is unable to detect the [access monitoring (STB)] from the B-TM, but detects a [B-TM access monitoring NG]. The B-TM proceeds from a STB (waiting state) to an ACT (operating state) by the access NG detection, and stops the multi-channel conversion actuation.

Hence, the TM switches over from the B-TM to the IP-CONV and sends the unicast message. Further, a switch back from the IP-CONV to the B-TM is executed by a manual command, and linking with this manual switchback command, the transmission of the unicast message from the TM is also switched back to the B-TM.

The TM transmits a [unicast message (1)] to the IP-CONV, and confirms an [ACK] from the IP-CONV.

Subsequently, the TM transmits a [unicast message (2)] to the IP-CONV, and confirms the [ACK] from the IP-CONV. However, in case an ACK retransmission NG is received also from the IP-CONV, the TM performs a log/gathering only.

Subsequently, the TM transmits the [access monitoring] to the B-TM, and by detecting the [access monitoring (ACT)] from the B-TM, it finds that an ACT/STB state enters an access monitoring frame of the B-TM, and recognizes a state of the B-TM.

The B-TM does not perform the multicast conversion in case the unicast message is received in the ACT state.

When the TM makes a [switchover request] to the B-TM by a manual switchover command, a [response] from the B-TM is received, and the B-TM is restored by changing from the ACT state to the STB state, and transmits the [access monitoring (STB)] to the TM.

The TM, upon detection of the [access monitoring (STB)] from the B-TM, transmits a [unicast message (3)] to the B-TM, and receives the [ACT] from the B-TM. At this point of time, the IP-CONV stops the multicast conversion actuation.

Figure 17:
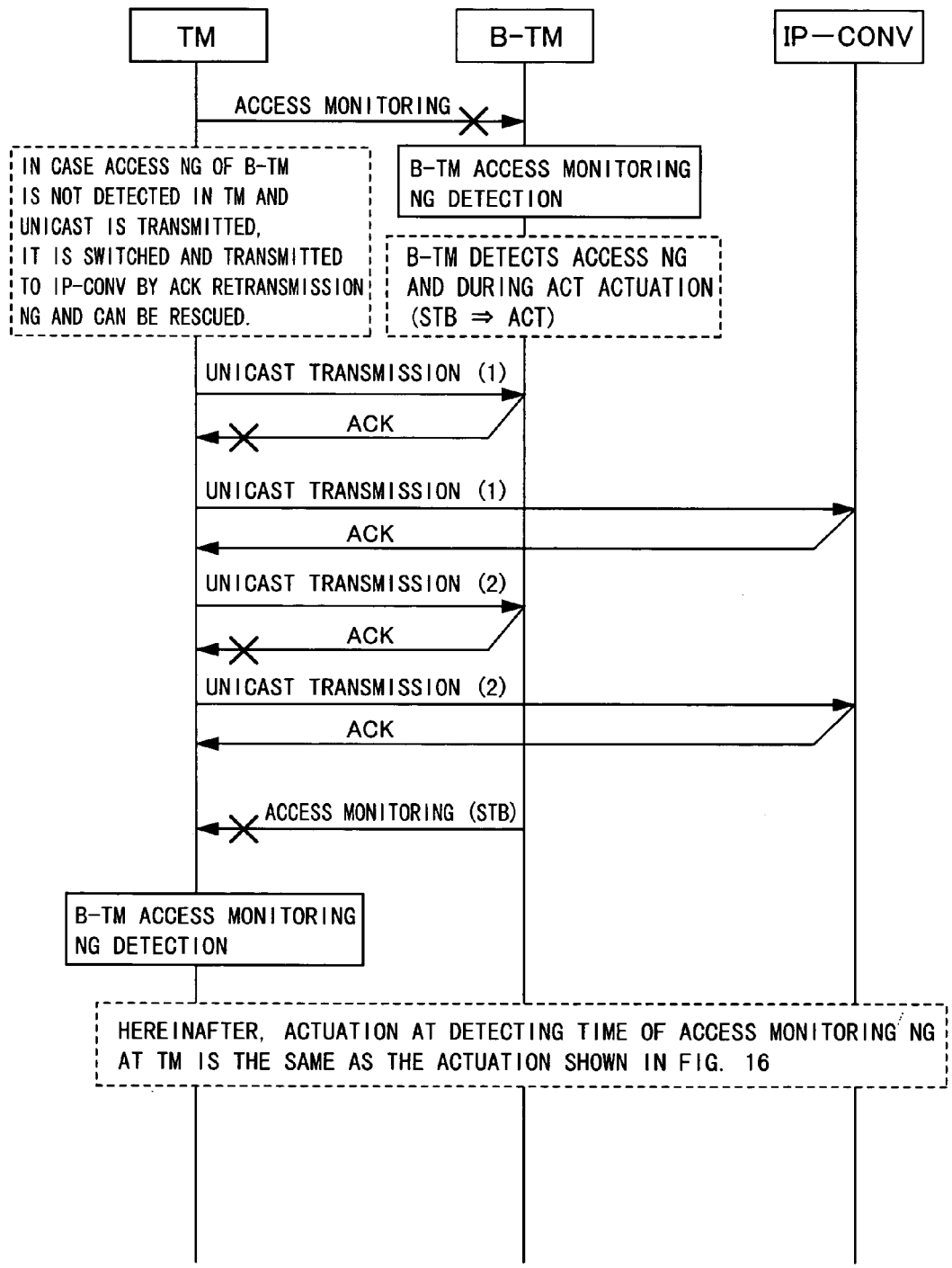
FIG. 17 is an actuation flow chart showing another embodiment of the common message communication according to the present invention.

FIG. 17 is an actuation flow chart showing another embodiment of the common message communication according to the present invention. In FIG. 17, when there is no longer the access monitoring from the TM to the B-TM, the B-TM detects an [access monitoring NG], and proceeds from the STB (waiting state) to the ACT (operating state), and stops the multicast conversion actuation.

The TM, when unable to detect the access NG of the B-TM but having transmitted the unicast message to the B-TM, transmits the unicast message by switching over to the IP-CONV by the ACT retransmission NG.

The TM, even when the access monitoring from the B-TM becomes NG, transmits the [unicast message (1)] to the B-TM, but is unable to confirm the [ACK] from the B-TM, and therefore, transmits the [unicast message (1)] to the IP-CONV, and then, can confirm the [ACK] from the IP-CONV, and by switching over from the B-TM to the IP-CONV, provides the multicast message from the IP-CONV to the IP terminal Eqi inside the lodgment.

Subsequently, the TM, either transmits a [multicast message (2)] to the B-TM or transmits the [unicast messeage (2)] to the IP-CONV because the B-TM is not yet recovered from a trouble and the [ACK] from the B-TM cannot be confirmed, and confirms the [ACK] from the IP-CONV.

Even at this point of time, the TM cannot confirm the [access monitoring (STB)] from the B-TM, and detects the B-TM access monitoring NG.

In this manner, the IP exchange (TM) 2 according to the present invention performs the access confirmation between the backup exchange (B-TM) 6 and the IP-CONV (IP converter) 8, and in case the access confirmation with the backup exchange (B-TM) 6 cannot be secured due to the fault of the circuit (network) 5 of the operating system (A system) or the backup exchange 6 (B-TM), transmits the unicast message to the IP converter (IP-CONV) through the circuit (network) 5 of the waiting system (B system), and therefore, can backup and continue the operation inside the lodgment of the common message, and can realize enhancement of the reliability of the lodgment.

As described above, the backup exchange 6 according to the present invention, at the time of the trouble of the IP exchange 2 or the fault of the circuit (network) 5, backs up the extension telephone calls of a plurality of IP terminals Eqi inside the lodgment, and therefore, even when the trouble of the IP exchange 2 of the center and the fault of the circuit (network) 5 occur, can avoid inability to make all the extension telephone calls of the IP terminals Eqi inside the lodgment, and can secure the extension telephone calls inside the lodgment, so that the telephone call services provided by the system can be minimally guaranteed.

Consequently, according to the IP telephone system according to the present invention, by duplexing the main control device of the IP exchange, creating a N+1 redundancy of the signal control device, duplexing the circuit, and providing the backup exchange at each lodgment, the system can be backed up for the trouble of the device or the fault of the circuit, and can be adapted to all types of the IP telephone systems.

What is claimed is:

1. An IP telephone system configured by a main control device for controlling the entire operation of an IP exchange; said IP exchange storing a plurality of IP terminals for each lodgment through a circuit by a control of said main control device and comprising a plurality of signal control devices performing a call control; said circuit for connecting between said IP exchange and said lodgment; a backup exchange installed in said lodgment for detecting a trouble of said IP exchange or a fault of said circuit and backing up said lodgment; and said plurality of lodgments comprising said plurality of IP terminals, said IP telephone system performing a centralized control and operation of all the IP terminals by the IP exchange, wherein said backup exchange performs an access confirmation with said IP exchange, and in a case in which the access confirmation cannot be secured from said IP exchange, determines it as an occurrence of a fault of said IP exchange or a failure of said circuit, and switches over from a waiting state to an operating state; said IP exchange performs an access confirmation with said IP terminals installed in said plurality of lodgments; said plurality of IP terminals, in a case in which a life check based on the access confirmation from said IP exchange cannot be received, log in to said backup exchange after logging out from said IP exchange; said backup exchange performs communication control of said IP terminal which is logged in said backup exchange.

2. The IP telephone system according to claim 1, wherein said IP exchange designates said lodgment and selectively transmits an unicast message of a common order.

3. The IP telephone system according to claim 1, wherein said main control device installs IP addresses in said plurality of signal control devices, and in a case in which a trouble is developed in one set signal control device, changes the IP address of a spare signal control device to the IP address of the signal control device in which the trouble is developed, and performs a control of switching over the signal control device in which the trouble is developed to the spare signal control device.

4. The IP telephone system according to claim 1, wherein said circuit comprises the circuits of two systems, and said signal control device comprises LAN ports of two-system corresponding and connected to said circuits of two-system, and in a case in which one of LAN ports of said two system develops a trouble during actuation, the signal control device operates by switching over to the other LAN port.

5. The IP telephone system according to claim 1, wherein said backup exchange, in a case in which an actuation possible notice from said IP exchange is received, determines that the fault of said IP exchange or the failure of said circuit is recovered, switches over from an operating state to a waiting state, and stops an access confirmation with said IP terminals;

wherein said IP terminals, in a case in which a life check based on the access confirmation from said backup exchange cannot be received, log in to said IP exchange after logging out from said backup exchange; and wherein said IP exchange performs communication control of said IP terminal which is logged in said IP exchange.

6. An IP telephone method for an IP telephone system that includes a main control device for controlling the entire operation of an IP exchange; said IP exchange storing a plurality of IP terminals for each lodgment through a circuit by a control of said main control device and comprising a plurality of signal control devices performing a call control; said circuit for connecting between said IP exchange and said lodgment; a backup exchange installed in said lodgment for detecting a trouble of said IP exchange or a fault of said circuit and backing up said lodgment; and said plurality of lodgments comprising said plurality of IP terminals, said IP telephone method comprising:

performing a centralized control and operation of all the IP terminals by said IP exchange, wherein said backup exchange performs an access confirmation with said IP exchange;

in a case in which the access confirmation cannot be secured from said IP exchange, determining it as an occurrence of a fault of said IP exchange or a failure of said circuit, and switching over from a waiting state to an operating state, and performing, by said IP exchange, an access confirmation with said IP terminals installed in said plurality of lodgments;

in case in which a life check based on the access confirmation from said IP exchange cannot be received, said plurality of IP terminals performing a log in to said backup exchange after logging out from said IP exchange, and performing, by said backup exchange, communication control of said IP terminal which is logged in said backup exchange.

7. The IP telephone method according to claim 6, further comprising:

installing, by said main control device, IP addresses in said plurality of signal control devices;

in case in which a trouble is developed in one set signal control device, changing the IP address of a spare signal control device to the IP address of the signal control device in which the trouble is developed, and performing a control of switching over the signal control device in which the trouble is developed to the spare signal control device.

8. The IP telephone method according to claim 6, wherein said circuit comprises the circuits of two systems, and said signal control device comprises LAN ports of two-system corresponding and connected to said circuits of two-system, the method further comprising:

and in case in which one of LAN ports of said two system develops a trouble during actuation, operating the signal control device by switching over to the other LAN port.

9. The IP telephone system according to claim 6, determining, by said backup exchange, in case in which an actuation possible notice from said IP exchange is received, that the fault of said IP exchange or the failure of said circuit is recovered, switching over from an operating state to an waiting state, and stopping an access confirmation with said IP terminals;

in case in which a life check based on the access confirmation from said backup exchange cannot be received, logging in, by said IP terminals, to said IP exchange after logging out from said backup exchange, and performing communication control, by said IP exchange, of said IP terminal which is logged in said IP exchange.

* * * * *